United States Patent
Kuribayashi et al.

(10) Patent No.: US 12,055,199 B2
(45) Date of Patent: Aug. 6, 2024

(54) VEHICLE DRIVE TRANSMISSION DEVICE

(71) Applicant: AISIN CORPORATION, Aichi (JP)

(72) Inventors: Fumiaki Kuribayashi, Kariya (JP); Yuki Habara, Kariya (JP); Eiji Kida, Kariya (JP); Kenji Ishida, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/031,083

(22) PCT Filed: Oct. 19, 2021

(86) PCT No.: PCT/JP2021/038572
§ 371 (c)(1),
(2) Date: Apr. 10, 2023

(87) PCT Pub. No.: WO2022/102354
PCT Pub. Date: May 19, 2022

(65) Prior Publication Data
US 2023/0375075 A1     Nov. 23, 2023

(30) Foreign Application Priority Data

Nov. 10, 2020  (JP) .................................. 2020-187451

(51) Int. Cl.
*F16H 3/089*     (2006.01)
*F16D 47/00*     (2006.01)
(Continued)

(52) U.S. Cl.
CPC .............. *F16H 3/089* (2013.01); *F16D 47/00* (2013.01); *F16H 63/08* (2013.01);
(Continued)

(58) Field of Classification Search
CPC ...... F16H 3/089; F16H 63/08; F16H 63/3043; F16H 63/3069
(Continued)

(56) References Cited

U.S. PATENT DOCUMENTS 4,922,767 A * 5/1990 Toshifumi ............... F16H 3/089
                                                      74/333
9,039,559 B2   5/2015 Gassmann
(Continued)

FOREIGN PATENT DOCUMENTS

| JP | 2016-114227 A | 6/2016 |
| JP | 2016-516161 A | 6/2016 |
| WO | 2019/189006 A1 | 10/2019 |

OTHER PUBLICATIONS

Dec. 7, 2021 International Search Report issued in International Patent Application No. PCT/JP2021/038572.
(Continued)

*Primary Examiner* — Ha Dinh Ho
(74) *Attorney, Agent, or Firm* — Oliff PLC

(57) ABSTRACT

In a vehicle drive transmission device, a transmission includes an intermesh first engagement device, a frictional second engagement device, a first drive device configured to drive the first engagement device, and a second drive device configured to drive the second engagement device. The first drive device includes a first shift drum, a first cam mechanism configured to convert rotational motion of the first shift drum into linear motion, and a first transmission mechanism configured to perform the linear motion. The second drive device includes a second shift drum, a second cam mechanism configured to convert rotational motion of the second shift drum into linear motion, and a second transmission mechanism configured to perform the linear motion. The first shift drum and the second shift drum are connected so as to rotate integrally with each other via a drive shaft. A drum drive source is provided to drive the drive shaft.

6 Claims, 9 Drawing Sheets

(51) Int. Cl.
*F16H 63/08* (2006.01)
*F16H 63/30* (2006.01)

(52) U.S. Cl.
CPC ..... *F16H 63/3043* (2013.01); *F16H 63/3069* (2013.01); *F16H 2063/3056* (2013.01); *F16H 2063/3073* (2013.01); *F16H 2200/0034* (2013.01)

(58) Field of Classification Search
USPC ........................................................ 74/337.5
See application file for complete search history.

(56) References Cited

U.S. PATENT DOCUMENTS

| | | | |
|---|---|---|---|
| 10,968,982 B2 * | 4/2021 | Barendrecht | B60K 17/043 |
| 2010/0248885 A1 * | 9/2010 | Phillips | B60K 17/04 |
| | | | 475/205 |
| 2016/0017968 A1 | 1/2016 | Kaltenbach et al. | |
| 2016/0312869 A1 * | 10/2016 | Walter | F16H 37/021 |
| 2017/0152947 A1 | 6/2017 | Imafuku | |
| 2019/0078678 A1 * | 3/2019 | Yamamoto | F16H 63/18 |
| 2019/0301576 A1 * | 10/2019 | Harada | F16H 37/0813 |
| 2022/0379711 A1 * | 12/2022 | Gassmann | B60K 6/365 |

OTHER PUBLICATIONS

Mar. 18, 2024 Office Action issued in European Patent Application No. 21891601.3.

* cited by examiner

VEHICLE DRIVE TRANSMISSION DEVICE

TECHNICAL FIELD

The present disclosure relates to a vehicle drive transmission device including an input member drivingly connected to a driving force source for wheels, an output member drivingly connected to the wheels, and a transmission that changes the speed of rotation transmitted from the input member side and transmits the rotation to the output member side.

BACKGROUND ART

An example of such a vehicle drive transmission device is disclosed in Patent Document 1 below. In the description of "BACKGROUND ART" and "Problem to be Solved by the Disclosure", signs used in Patent Document 1 are shown in parentheses.

In the vehicle drive transmission device of Patent Document 1, a transmission is configured to form a first shift speed (i1) and a second shift speed (i2) having a smaller speed ratio than the first shift speed. The transmission includes a meshing engagement device (5) for switching the first shift speed (i1) and the second shift speed (i2), and a frictional engagement device (6) for maintaining power transmission between an input member (2) and an output member when switching the shift speeds.

In the vehicle drive transmission device described above, the frictional engagement device (6) maintains the power transmission between the input member (2) and the output member even in a case where the meshing engagement device (5) is in a neutral state when the shift speed of the transmission is switched from the first shift speed (i1) to the second shift speed (i2). In this way, a shock that occurs when the shift speed of the transmission is switched from the first shift speed (i1) to the second shift speed (i2) is reduced.

RELATED ART DOCUMENTS

Patent Documents

Patent Document 1: Japanese Unexamined Patent Application Publication (Translation of PCT Application) No. 2016-516161 (JP 2016-516161 A)

SUMMARY OF THE DISCLOSURE

Problem to be Solved by the Disclosure

Although description is not given in Patent Document 1, in the vehicle drive transmission device described above, the meshing engagement device (5) and the frictional engagement device (6) are different in terms of the type of engagement device. Therefore, drive devices for driving engagement and disengagement of those engagement devices are generally provided independently with different configurations. In such configurations, however, the number of components of the vehicle drive transmission device as a whole is likely to increase because the two drive devices are provided independently. Thus, the size and cost of the device are likely to increase.

Therefore, there is a demand to realize a vehicle drive transmission device in which the number of components can be reduced in a configuration including a meshing engagement device and a frictional engagement device.

Means for Solving the Problem

As a characteristic configuration of the vehicle drive transmission device in view of the above, the vehicle drive transmission device includes:

an input member drivingly connected to a driving force source for a wheel;

an output member drivingly connected to the wheel; and a transmission configured to form a plurality of shift speeds including a first shift speed and a second shift speed having a smaller speed ratio than the first shift speed, and to change a speed of rotation transmitted from a side of the input member at a speed ratio corresponding to a formed shift speed among the plurality of shift speeds and transmit the rotation to a side of the output member, in which the transmission includes an intermesh first engagement device, a frictional second engagement device, a first drive device configured to drive the first engagement device, and a second drive device configured to drive the second engagement device, the first shift speed is formed when the first engagement device is engaged and the second engagement device is disengaged, and the second shift speed is formed when the first engagement device is disengaged and the second engagement device is engaged, the first drive device includes a rotatably supported first shift drum, a first cam mechanism configured to convert rotational motion of the first shift drum into linear motion, and a first transmission mechanism configured to perform linear motion by the first cam mechanism, the second drive device includes a rotatably supported second shift drum, a second cam mechanism configured to convert rotational motion of the second shift drum into linear motion, and a second transmission mechanism configured to perform linear motion by the second cam mechanism, the first shift drum and the second shift drum are connected so as to rotate integrally with each other via a drive shaft, and a drum drive source is provided to drive the drive shaft to rotate the first shift drum and the second shift drum.

As another characteristic configuration of the vehicle drive transmission device in view of the above, the vehicle drive transmission device includes:

an input member drivingly connected to a driving force source for a wheel;

an output member drivingly connected to the wheel; and a transmission configured to form a plurality of shift speeds including a first shift speed and a second shift speed having a smaller speed ratio than the first shift speed, and to change a speed of rotation transmitted from a side of the input member at a speed ratio corresponding to a formed shift speed among the plurality of shift speeds and transmit the rotation to a side of the output member, in which the transmission includes an intermesh first engagement device, a frictional second engagement device, an intermesh third engagement device, a first drive device configured to drive the first engagement device, and a second drive device configured to drive the second engagement device, the first shift speed is formed when the first engagement device is engaged and both the second engagement device and the third engagement device are disengaged, and the second shift speed is formed when the first engagement device is disengaged and at least one of the second engagement device and the third engagement device is engaged, the first drive device includes a rotatably supported first shift drum, a first cam mechanism configured to convert rotational motion of the first shift drum into linear motion, and a first transmission mechanism configured to perform linear motion by the first cam mechanism, the second drive device includes a rotatably supported second shift drum, a second cam mechanism configured to convert rotational motion of the second shift drum into linear motion, and a second transmission mechanism configured to perform linear motion by the second cam mechanism, the first shift drum and the second shift drum are connected so as to rotate integrally with each other via a drive shaft, and a drum drive source is provided to drive the drive shaft to rotate the first shift drum and the second shift drum.

According to these characteristic configurations, the first shift drum of the first drive device that drives the first engagement device and the second shift drum of the second drive device that drives the second engagement device are connected so as to rotate integrally with each other via the drive shaft driven by the drum drive source. Therefore, the two engagement devices of different types for forming and switching the shift speeds in the transmission can be driven by the drive of the single drum drive source. Thus, the number of components can be reduced as compared with a configuration in which the drive devices are provided independently for the intermesh first engagement device and the frictional second engagement device. As a result, it is easy to suppress an increase in the size and cost of the vehicle drive transmission device.

According to these characteristic configurations, the frictional second engagement device is engaged when switching the shift speed of the transmission from the first shift speed to the second shift speed. Therefore, it is possible to avoid interruption of the power transmission between the input member and the output member when the engaged intermesh first engagement device is disengaged. Thus, it is possible to suppress fluctuation in the wheel driving force that occurs when the shift speed of the transmission is switched from the first shift speed to the second shift speed.

MODES FOR CARRYING OUT THE DISCLOSURE

1. First Embodiment

Figure 1:
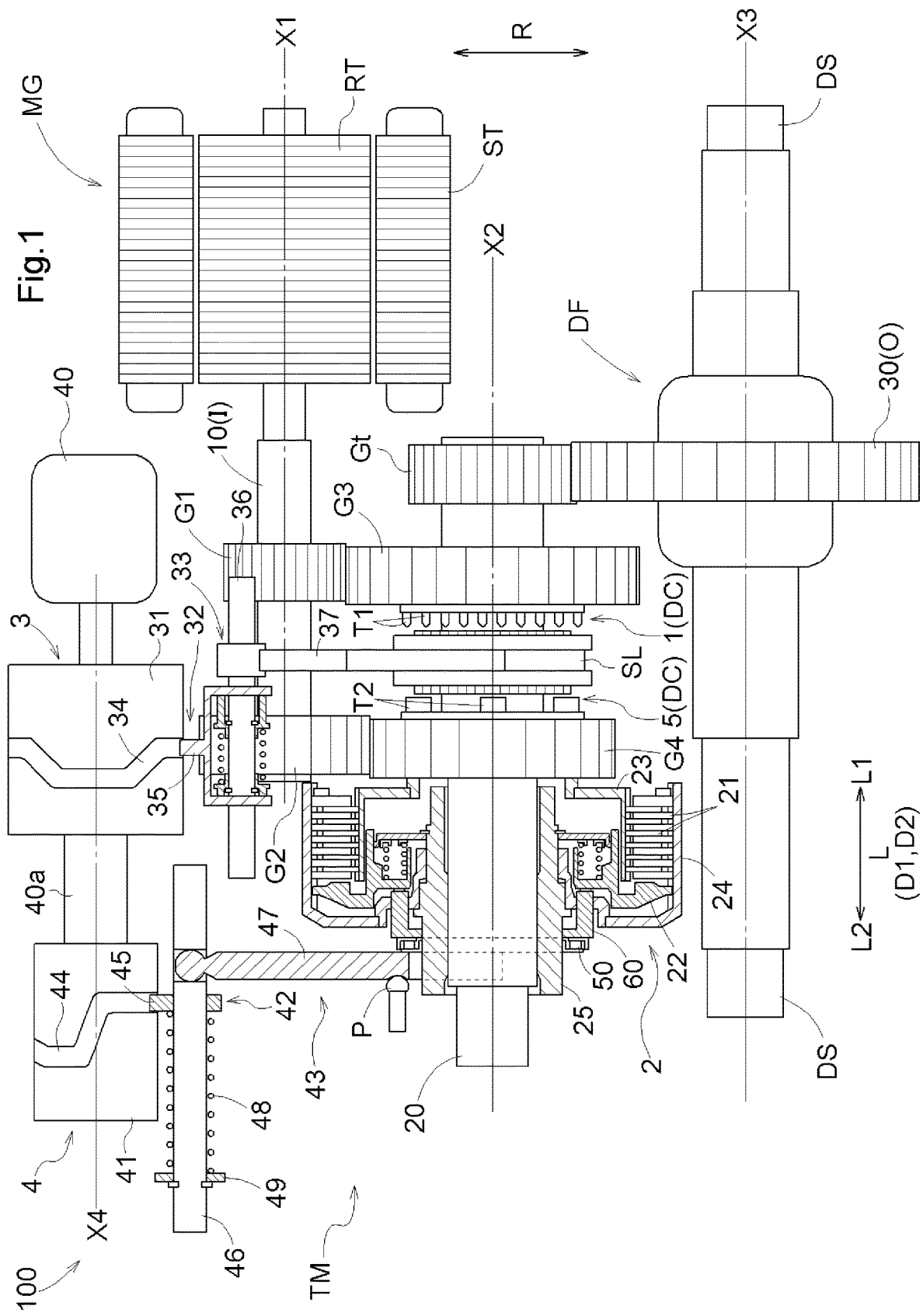
FIG. 1 is a diagram showing a vehicle drive transmission device according to a first embodiment.

Hereinafter, a vehicle drive transmission device 100 according to a first embodiment will be described with reference to the drawings. As shown in FIG. 1, the vehicle drive transmission device 100 includes an input member I, an output member O, and a transmission TM. In the present embodiment, the vehicle drive transmission device 100 further includes a differential gear mechanism DF.

The input member I is drivingly connected to a driving force source for wheels (not shown). In the present embodiment, a rotary electric machine MG corresponds to the "driving force source". In the present application, the "rotary electric machine" is used as a concept including any of a motor (electric motor), a generator (power generator), and a motor generator that functions as both a motor and a generator if necessary.

The rotary electric machine MG includes a stator ST and a rotor RT. The stator ST is fixed to a non-rotating member (for example, a case that houses the rotary electric machine MG and the like). The rotor RT is supported so as to be rotatable relative to the stator ST.

In the following description, a direction along a first axis X1 that is a rotation axis of the rotary electric machine MG (rotor RT) will be referred to as "axial direction L". One side in the axial direction L will be referred to as "first axial side L1" and the other side in the axial direction L will be referred to as "second axial side L2". A direction orthogonal to a rotation axis of a rotating member such as the rotor RT will be referred to as "radial direction R" with respect to each rotation axis. When it is not necessary to distinguish the rotation axis to be used as a reference, or when the rotation axis to be used as a reference is clear, the direction may be simply referred to as "radial direction R".

In the present embodiment, the input member I is a first shaft member 10 extending along the axial direction L. The first shaft member 10 is disposed on the first axis X1. That is, the first shaft member 10 is disposed coaxially with the rotor RT of the rotary electric machine MG. The first shaft member 10 is connected to the rotor RT so as to rotate integrally with the rotor RT. In the present embodiment, the first shaft member 10 is disposed on the second axial side L2 with respect to the rotor RT.

The transmission TM is configured to form a plurality of shift speeds including a first shift speed and a second shift speed having a smaller speed ratio than the first shift speed. The transmission TM changes the speed of rotation transmitted from the input member I side at a speed ratio corresponding to the formed shift speed among the plurality of shift speeds, and transmits the rotation to the output member O side. In the present embodiment, the transmission TM is configured to form two shift speeds that are the first shift speed and the second shift speed.

The transmission TM includes an intermesh first engagement device 1, a frictional second engagement device 2, a first drive device 3 for driving the first engagement device 1, and a second drive device 4 for driving the second engagement device 2. In the present embodiment, the transmission TM further includes an intermesh third engagement device 5, a first gear G1, a second gear G2, a third gear G3, a fourth gear G4, and a shifting output gear Gt.

In the transmission TM, the first shift speed is formed when the first engagement device 1 is engaged and the second engagement device 2 is disengaged. The second shift speed is formed when the first engagement device 1 is disengaged and the second engagement device 2 is engaged. In the present embodiment, the first shift speed is formed when the first engagement device 1 is engaged and both the second engagement device 2 and the third engagement device 5 are disengaged. The second shift speed is formed in the disengaged state of the first engagement device 1 and at least one of a directly engaged state of the second engagement device 2 and the engaged state of the third engagement device 5. The "directly engaged state" of the frictional second engagement device 2 is an engaged state with no rotational speed difference (slip) between an input element and an output element of the second engagement device 2. The "engaged state" of the second engagement device 2 includes a slipping engaged state in addition to the directly engaged state. The "slipping engaged state" is an engaged state with a rotational speed difference (slip) between the input element and the output element of the second engagement device 2.

The first gear G1 and the second gear G2 are disposed on the first axis X1. That is, the first gear G1 and the second gear G2 are disposed so as to rotate about the first axis X1 serving as the rotation axis. In the present embodiment, the first gear G1 and the second gear G2 are connected to the first shaft member 10 so as to rotate integrally with the first shaft member 10. In the present embodiment, the first gear G1 is disposed on the first axial side L1 with respect to the second gear G2.

The third gear G3, the fourth gear G4, and the shifting output gear Gt are disposed on a second axis X2 different from the first axis X1. That is, the third gear G3, the fourth gear G4, and the shifting output gear Gt are disposed so as to rotate about the second axis X2 serving as a rotation axis. In the present embodiment, the second axis X2 extends parallel to the first axis X1. That is, in the present embodiment, the second axis X2 extends along the axial direction L.

In the present embodiment, the third gear G3 and the fourth gear G4 are supported so as to be rotatable relative to a second shaft member 20 disposed on the second axis X2. The shifting output gear Gt is connected to the second shaft member 20 so as to rotate integrally with the second shaft member 20. In the present embodiment, the third gear G3 is disposed on the first axial side L1 with respect to the fourth gear G4. The shifting output gear Gt is disposed on the first axial side L1 with respect to the third gear G3. That is, in the present embodiment, the fourth gear G4, the third gear G3, and the shifting output gear Gt are disposed in this order from the second axial side L2 to the first axial side L1.

The first gear G1 and the third gear G3 are disposed so as to mesh with each other. The second gear G2 and the fourth gear G4 are disposed so as to mesh with each other. In the present embodiment, the first gear G1 is formed to have a smaller diameter than the second gear G2. The third gear G3 is formed to have a larger diameter than the fourth gear G4. As described above, the first gear G1 and the second gear G2 are disposed coaxially, and the third gear G3 and the fourth gear G4 are disposed coaxially. Therefore, in the present embodiment, the gear ratio of the third gear G3 to the first gear G1 is larger than the gear ratio of the fourth gear G4 to the second gear G2.

In the present embodiment, when the first engagement device 1 is engaged, the third gear G3 is connected to the second shaft member 20 so as to rotate integrally with the second shaft member 20. When the first engagement device 1 is disengaged, the third gear G3 is disconnected from the second shaft member 20 so as to rotate relative to the second shaft member 20. In the present embodiment, when the third engagement device 5 is engaged, the fourth gear G4 is connected to the second shaft member 20 so as to rotate integrally with the second shaft member 20 regardless of the engagement state of the second engagement device 2. When both the second engagement device 2 and the third engagement device 5 are disengaged, the fourth gear G4 is disconnected from the second shaft member 20 so as to rotate relative to the second shaft member 20. When the third engagement device 5 is disengaged and the second engagement device 2 is engaged, the rotational speed difference between the fourth gear G4 and the second shaft member 20 decreases as the engagement force of the second engagement device 2 increases. The state with the rotational speed difference between the fourth gear G4 and the second shaft member 20 is the slipping engaged state of the second engagement device 2. When the engagement force of the second engagement device 2 reaches a predetermined level or higher, the second engagement device 2 is brought into the directly engaged state, and the fourth gear G4 rotates integrally with the second shaft member 20.

As described above, in the present embodiment, the gear ratio of the third gear G3 to the first gear G1 is larger than the gear ratio of the fourth gear G4 to the second gear G2. Therefore, when the first engagement device 1 connects the third gear G3 to the second shaft member 20 while the fourth gear G4 is not connected to the second shaft member 20, the first shift speed is formed as a low speed at which the speed ratio is relatively large. When at least one of the second engagement device 2 and the third engagement device 5 connects the fourth gear G4 to the second shaft member 20 while the third gear G3 is not connected to the second shaft member 20, the second shift speed is formed as a high speed at which the speed ratio is relatively small.

The differential gear mechanism DF includes a differential input gear 30 that is an input element of the differential gear mechanism DF. The differential gear mechanism DF distributes the rotation of the differential input gear 30 to a pair of drive shafts DS drivingly connected to the wheels (not shown).

The differential input gear 30 meshes with the shifting output gear Gt of the transmission TM. In the present embodiment, the differential input gear 30 functions as the output member O drivingly connected to the wheels. The differential input gear 30 is disposed on a third axis X3 different from the first axis X1 and the second axis X2. That is, the differential input gear 30 is disposed so as to rotate about the third axis X3 serving as a rotation axis. In the present embodiment, the third axis X3 extends parallel to the first axis X1 and the second axis X2. That is, in the present embodiment, the third axis X3 extends along the axial direction L.

Figure 2:
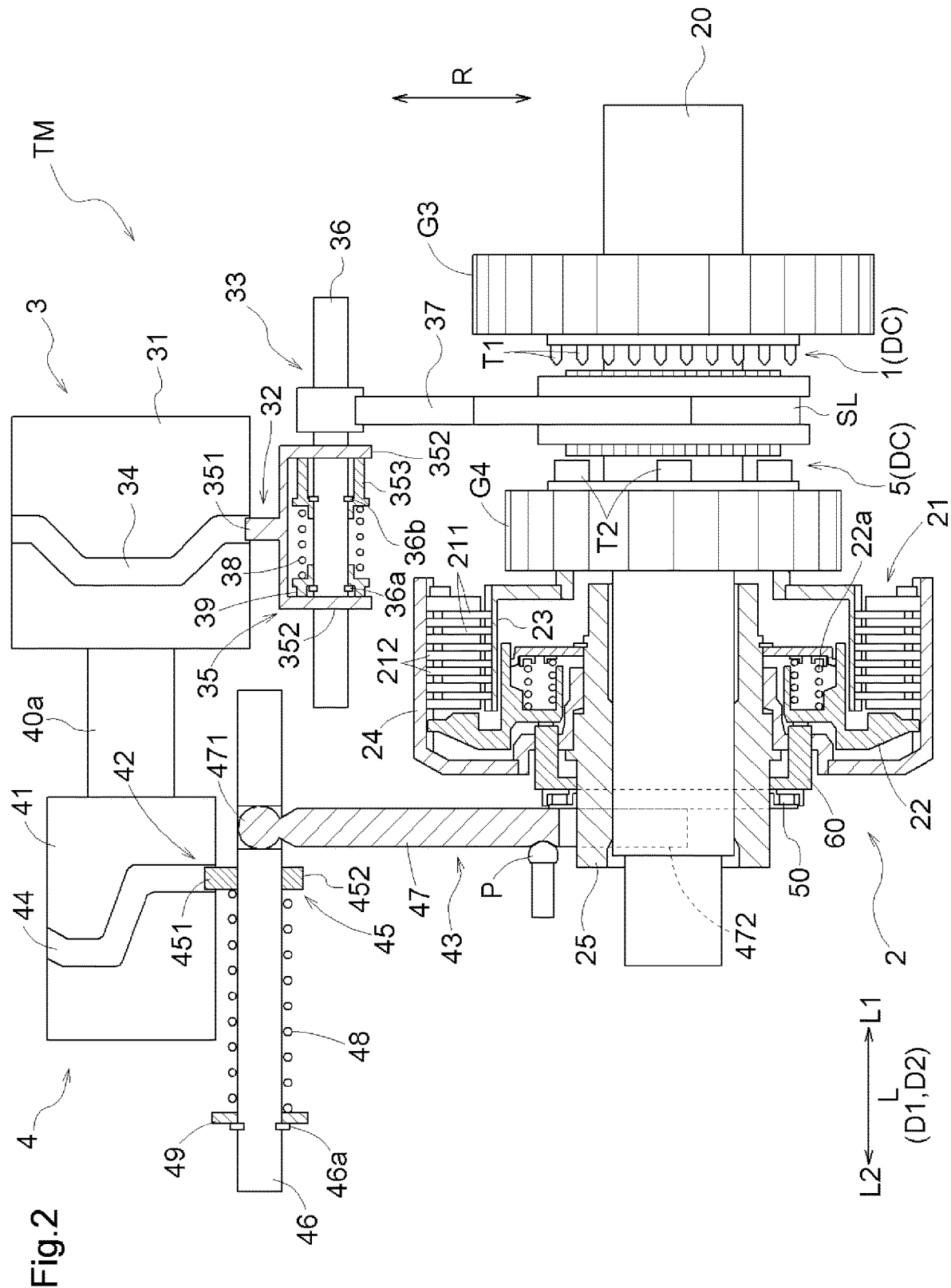
FIG. 2 is a diagram showing a transmission of the vehicle drive transmission device according to the first embodiment.

As shown in FIG. 2, in the present embodiment, the first engagement device 1 is a meshing engagement device (dog clutch) switchable between the engaged state and the disengaged state by a switching member SL. FIG. 2 is a diagram showing the configuration of the transmission TM. In FIG. 2, illustration of some elements (shifting output gear Gt and the like) is omitted for convenience of description (the same applies to FIGS. 5 to 10).

The switching member SL is movable in a first direction D1 by the first drive device 3. In the present embodiment, the switching member SL has a tubular shape covering the outer side of the second shaft member 20 in the radial direction R. The switching member SL is moved in the axial direction L relative to the second shaft member 20 by the first drive device 3. That is, the first direction D1 agrees with the axial direction L in the present embodiment.

In the present embodiment, the inner peripheral surface of the switching member SL has a plurality of first grooves (not shown) that engages with a plurality of first engagement teeth T1 connected to the third gear G3 so as to rotate integrally with the third gear G3. The plurality of first engagement teeth T1 is formed so as to protrude from the third gear G3 to the second axial side L2. The plurality of first engagement teeth T1 is formed to engage with the plurality of first grooves so as to be movable in the axial direction L and non-rotatable in a circumferential direction relative to the first grooves. Therefore, the first engagement device 1 is engaged when the switching member SL moves in the first direction D1 (in this case, the axial direction L) relative to the second shaft member 20 and the plurality of first engagement teeth T1 engages with the plurality of first grooves of the switching member SL. The first engagement device 1 is disengaged when the plurality of first engagement teeth T1 separates from the plurality of first grooves.

In the present embodiment, the third engagement device 5 is also a meshing engagement device (dog clutch) switchable between the engaged state and the disengaged state by the switching member SL. That is, in the present embodiment, the third engagement device 5 is disposed to adjoin the first engagement device 1 in the first direction D1 (in this case, the axial direction L). The third engagement device 5 is driven by the first drive device 3 that drives the first engagement device 1.

In the present embodiment, the inner peripheral surface of the switching member SL has, in addition to the first grooves described above, a plurality of second grooves (not shown) that engages with a plurality of second engagement teeth T2 connected to the fourth gear G4 so as to rotate integrally with the fourth gear G4. The plurality of second engagement teeth T2 is formed so as to protrude from the fourth gear G4 to the first axial side L1. The plurality of second engagement teeth T2 is formed to engage with the plurality of second grooves so as to be movable in the axial direction L and non-rotatable in the circumferential direction relative to the second grooves. Therefore, the third engagement device 5 is engaged when the switching member SL moves in the first direction D1 (in this case, the axial direction L) relative to the second shaft member 20 and the plurality of second engagement teeth T2 engages with the plurality of second grooves of the switching member SL. The third engagement device 5 is disengaged when the plurality of second engagement teeth T2 separates from the plurality of second grooves.

Thus, in the present embodiment, the first engagement device 1 and the third engagement device 5 share the switching member SL. Therefore, in the present embodiment, the first engagement device 1 and the third engagement device 5 constitute a meshing engagement device DC including the switching member SL. In the meshing engagement device DC, when the plurality of first engagement teeth T1 engages with the plurality of first grooves of the switching member SL to engage the first engagement device 1, the plurality of second engagement teeth T2 separates from the plurality of second grooves of the switching member SL to disengage the third engagement device 5. When the plurality of second engagement teeth T2 engages with the plurality of second grooves of the switching member SL to engage the third engagement device 5, the plurality of first engagement teeth T1 separates from the plurality of first grooves of the switching member SL to disengage the first engagement device 1. The meshing engagement device DC is switchable to a neutral state in which both the first engagement device 1 and the third engagement device 5 are disengaged. When the meshing engagement device DC is in the neutral state, no shift speed is formed in the transmission TM unless the second engagement device 2 is engaged. Thus, the rotation is not transmitted between the rotary electric machine MG and the differential gear mechanism DF, that is, the driving force is not transmitted between the rotary electric machine MG and the wheels.

As described above, in the present embodiment, the transmission TM further includes the intermesh third engagement device 5.

The third engagement device 5 is disposed to adjoin the first engagement device 1 in the first direction D1 and is driven by the first drive device 3.

The first shift speed is formed when the first engagement device 1 is engaged and both the second engagement device 2 and the third engagement device 5 are disengaged. The second shift speed is formed when the first engagement device 1 is disengaged and at least one of the second engagement device 2 and the third engagement device 5 is engaged.

According to this configuration, the second engagement device 2 can be disengaged while maintaining the state in which the second shift speed is formed by engaging the third engagement device 5. As a result, when the frictional second engagement device 2 needs to keep applying the driving force to maintain the engaged state, the need for the driving force can be eliminated. Therefore, the energy efficiency of the vehicle drive transmission device 100 can be increased.

According to this configuration, the first engagement device 1 and the third engagement device 5 are disposed to adjoin each other in the first direction D1 and are driven by the common first drive device 3. This facilitates partial sharing of the configuration between the first engagement device 1 and the third engagement device 5. Thus, the first engagement device 1 and the third engagement device 5 as a whole can easily be downsized as compared with a configuration in which the first engagement device 1 and the third engagement device 5 are provided independently.

In the present embodiment, the second engagement device 2 includes a friction member 21 and a piston 22 that presses the friction member 21.

The friction member 21 includes an inner friction material 211 and an outer friction material 212. Both the inner friction material 211 and the outer friction material 212 have an annular plate shape, and are disposed coaxially with each other. A plurality of the inner friction materials 211 and a plurality of the outer friction materials 212 are provided, and these are disposed alternately along the axial direction L. Either the inner friction material 211 or the outer friction material 212 may be friction plates and the remaining may be separate plates.

The inner friction materials 211 are supported by an inner support member 23 from the inner side in the radial direction R. The inner support member 23 has a tubular shape having an axis along the axial direction L. The inner support member 23 is connected to the fourth gear G4 so as to rotate integrally with the fourth gear G4. In the illustrated example, the inner support member 23 is formed so as to extend from the fourth gear G4 to the second axial side L2, extend outward in the radial direction R, and further extend to the second axial side L2 to cover the outer side of the second shaft member 20 in the radial direction R.

In this example, a plurality of spline grooves extending in the axial direction L is formed in the inner peripheral portions of the inner friction materials 211 so as to be distributed in the circumferential direction. Similar spline grooves are also formed in the outer peripheral portion of the inner support member 23 so as to be distributed in the circumferential direction. When the spline grooves are engaged with each other, the inner friction materials 211 are supported by the inner support member 23 from the inner side in the radial direction R. In this way, the inner friction materials 211 are supported so as to be slidable in the axial direction L with their rotation relative to the inner support member 23 being restricted.

The outer friction materials 212 are supported by an outer support portion 24 from the outer side in the radial direction R. The outer support portion 24 has a tubular shape having an axis along the axial direction L. The outer support portion 24 is connected to the second shaft member 20 so as to rotate integrally with the second shaft member 20. In the present embodiment, the outer support portion 24 is connected to the second shaft member 20 so as to rotate integrally with the second shaft member 20 via a tubular member 25 having a tubular shape having an axis along the axial direction L. The tubular member 25 is formed so as to cover the outer peripheral surface of the second shaft member 20, and is connected to the second shaft member 20 so as to rotate integrally with the second shaft member 20. In the illustrated example, the outer support portion 24 is formed so as to extend outward in the radial direction R from the tubular member 25 and extend to the first axial side L1.

In the present embodiment, the piston 22 is urged to the second axial side L2 by an urging member 22a such as a spring. When the piston 22 is pressed from the second axial side L2 against an urging force of the urging member 22a, the piston 22 slides to the first axial side L1 and presses the friction member 21.

The first drive device 3 includes a rotatably supported first shift drum 31, a first cam mechanism 32 that converts rotational motion of the first shift drum 31 into linear motion, and a first transmission mechanism 33 that performs linear motion by the first cam mechanism 32. The second drive device 4 includes a rotatably supported second shift drum 41, a second cam mechanism 42 that converts rotational motion of the second shift drum 41 into linear motion, and a second transmission mechanism 43 that performs linear motion by the second cam mechanism 42.

In the present embodiment, the first shift drum 31 and the second shift drum 41 are disposed on a fourth axis X4 different from the first axis X1 to the third axis X3. That is, the first shift drum 31 and the second shift drum 41 are disposed coaxially and rotate about the fourth axis X4 serving as a rotation axis. Each of the first shift drum 31 and the second shift drum 41 has a cylindrical shape centered on the fourth axis X4. In the present embodiment, the fourth axis X4 extends parallel to the first axis X1 to the third axis X3. That is, in the present embodiment, the fourth axis X4 extends along the axial direction L.

As shown in FIG. 1, the vehicle drive transmission device 100 includes a drive source 40 that drives a drive shaft 40a. The drive shaft 40a is a shaft member that connects the first shift drum 31 and the second shift drum 41 so as to rotate integrally with each other. The drive shaft 40a is disposed on the fourth axis X4 and is formed so as to extend along the fourth axis X4. In this manner, the first shift drum 31 and the second shift drum 41 are connected so as to rotate integrally with each other via the drive shaft 40a. Various motors can be adopted as the drum drive source 40. For example, an alternating-current rotary electric machine to be driven by alternating-current power of a plurality of phases can be adopted.

As shown in FIG. 2, in the present embodiment, the first cam mechanism 32 includes a first cam path 34 and a first cam follower 35.

The first cam path 34 is provided along the rotation direction of the first shift drum 31. In the present embodiment, the first cam path 34 is a groove continuously formed on the outer peripheral surface of the first shift drum 31 along the circumferential direction. The first cam path 34 is formed such that the phase changes in response to the rotation of the first shift drum 31. The "phase" of the first cam path 34 is a position of the first cam path 34 in a direction along the rotation axis of the first shift drum 31 (in this case, the axial direction L). A detailed configuration of the first cam path 34 will be described later.

The first cam follower 35 performs linear motion in response to the phase change of the first cam path 34. The first cam follower 35 includes a first guided portion 351 guided by the first cam path 34, and a pair of first sliding portions 352 connected to the first guided portion 351 so as to move integrally with the first guided portion 351.

In the present embodiment, the first guided portion 351 is formed so as to extend along a specific radial direction R (vertical direction in FIG. 2). One end (upper end in FIG. 2) of the first guided portion 351 in the extending direction is disposed in the groove defining the first cam path 34.

In the present embodiment, each of the pair of first sliding portions 352 has a plate shape whose surfaces are oriented in the axial direction L. The pair of first sliding portions 352 is connected to the first guided portion 351 so as to maintain a predetermined distance in the axial direction L from each other.

In the present embodiment, the first transmission mechanism 33 drives the first engagement device 1 and the third engagement device 5 by performing linear motion depending on the phase of the first cam path 34. In the present embodiment, the first transmission mechanism 33 includes a first transmission shaft 36, a shift fork 37, a first elastic member 38, and a first support member 39.

The first transmission shaft 36 is a shaft member extending along the first direction D1 (in this case, the axial direction L). In the present embodiment, the first transmission shaft 36 is disposed through the pair of first sliding portions 352 in the axial direction L. The first transmission shaft 36 is supported so as to be movable in the axial direction L relative to the pair of first sliding portions 352.

The shift fork 37 is a member that switches the engagement state of the meshing engagement device DC. In the present embodiment, the shift fork 37 is connected to the first transmission shaft 36 so as to move integrally with the first transmission shaft 36. The shift fork 37 holds the switching member SL in a state in which the movement of the meshing engagement device DC relative to the switching member SL in the first direction D1 (in this case, the axial direction L) is restricted. In this way, the shift fork 37 moves integrally with the first transmission shaft 36 in the first direction D1 (in this case, the axial direction L), and accordingly the switching member SL moves in the first direction D1 (in this case, the axial direction L). Both the moving direction of the shift fork 37 and the moving direction of the switching member SL are the first direction D1 (in this case, the axial direction L). Therefore, the first direction D1 can be regarded as a direction along the linear motion of the first transmission mechanism 33.

The first elastic member 38 is a member having elasticity in the first direction D1 (in this case, the axial direction L). In the present embodiment, the first elastic member 38 is disposed so as to cover the outer side of the first transmission shaft 36 in the radial direction R. In this example, the first elastic member 38 is a compression coil spring through which the first transmission shaft 36 is inserted.

The first support member 39 is a member that supports the first elastic member 38 in cooperation with a support portion 353 of the first cam follower 35. In the present embodiment, the first support member 39 is disposed in abutment against the first elastic member 38 from the second axial side L2. The support portion 353 is disposed in abutment against the first elastic member 38 from the first axial side L1. In the present embodiment, the first support member 39 and the support portion 353 are disposed between the pair of first sliding portions 352 of the first cam follower 35. The first support member 39 is disposed in abutment against the first sliding portion 352 on the second axial side L2, and the support portion 353 is disposed in abutment against the first sliding portion 352 on the first axial side L1.

In the present embodiment, the first support member 39 has a tubular shape covering the outer peripheral surface of the first transmission shaft 36. The first support member 39 is supported so as to be slidable relative to the first transmission shaft 36 in the first direction D1 (in this case, the axial direction L). The movement of the first support member 39 relative to the first transmission shaft 36 to the second axial side L2 is restricted by a first restriction portion 36a provided to the first transmission shaft 36. In this example, the first restriction portion 36a is a snap ring fitted to a groove formed on the outer peripheral surface of the first transmission shaft 36.

In the present embodiment, the support portion 353 has a tubular shape covering the outer peripheral surface of the first transmission shaft 36. The support portion 353 is supported so as to be slidable relative to the first transmission shaft 36 in the first direction D1 (in this case, the axial direction L). The movement of the support portion 353 relative to the first transmission shaft 36 to the first axial side L1 is restricted by a second restriction portion 36b provided to the first transmission shaft 36. In this example, the second restriction portion 36b is a snap ring fitted to a groove formed on the outer peripheral surface of the first transmission shaft 36.

As described above, in the present embodiment, the first cam follower 35 of the first cam mechanism 32 is connected to the first transmission shaft 36 via the first elastic member 38. The first transmission shaft 36 is connected to the shift fork 37 that moves the switching member SL of the meshing engagement device DC constituted by the first engagement device 1 and the third engagement device 5 so as to move integrally with the shift fork 37. That is, in the present embodiment, the first transmission mechanism 33 transmits the driving force from the first cam mechanism 32 to the first engagement device 1 via the first elastic member 38.

In the present embodiment, the second transmission mechanism 43 drives the second engagement device 2 by performing linear motion depending on the phase of a second cam path 44. In the present embodiment, the second cam mechanism 42 includes the second cam path 44 and a second cam follower 45.

The second cam path 44 is provided along the rotation direction of the second shift drum 41. In the present embodiment, the second cam path 44 is a groove continuously formed on the outer peripheral surface of the second shift drum 41 along the circumferential direction. The second cam path 44 is formed such that the phase changes in response to the rotation of the second shift drum 41. The "phase" of the second cam path 44 is a position of the second cam path 44 in a direction along the rotation axis of the second shift drum 41 (in this case, the axial direction L). A detailed configuration of the second cam path 44 will be described later.

The second cam follower 45 performs linear motion in response to the phase change of the second cam path 44. The second cam follower 45 includes a second guided portion 451 guided by the second cam path 44, and a second sliding portion 452 connected to the second guided portion 451 so as to move integrally with the second guided portion 451.

In the present embodiment, the second guided portion 451 is formed so as to extend along a specific radial direction R (vertical direction in FIG. 2). One end (upper end in FIG. 2) of the second guided portion 451 in the extending direction is disposed in the groove defining the second cam path 44.

In the present embodiment, the second transmission mechanism 43 includes a second transmission shaft 46, a piston drive member 47, a second elastic member 48, a second support member 49, and a bearing 50.

The second transmission shaft 46 is a shaft member extending along a second direction D2 that is a direction along the linear motion of the second transmission mechanism 43. In the present embodiment, the second direction D2 agrees with the axial direction L.

In the present embodiment, the second transmission shaft 46 is disposed through the second sliding portion 452 in the axial direction L. The second transmission shaft 46 is supported so as to be movable in the axial direction L relative to the second sliding portion 452.

The second elastic member 48 is a member having elasticity in the second direction D2 (in this case, the axial direction L). In the present embodiment, the second elastic member 48 is disposed so as to cover the outer side of the second transmission shaft 46 in the radial direction R. In this example, the second elastic member 48 is a compression coil spring through which the second transmission shaft 46 is inserted.

The second support member 49 is a member that supports the second elastic member 48 in cooperation with the second sliding portion 452 of the second cam follower 45. In the present embodiment, the second support member 49 is disposed in abutment against the second elastic member 48 from the second axial side L2. The second sliding portion 452 is disposed in abutment against the second elastic member 48 from the first axial side L1.

In the present embodiment, the second support member 49 has a tubular shape covering the outer peripheral surface of the second transmission shaft 46. The second support member 49 is supported so as to be slidable relative to the second transmission shaft 46 in the second direction D2 (in this case, the axial direction L). The movement of the second support member 49 relative to the second transmission shaft 46 to the second axial side L2 is restricted by a restriction portion 46a provided to the second transmission shaft 46. In this example, the restriction portion 46a is a snap ring fitted to a groove formed on the outer peripheral surface of the second transmission shaft 46.

The bearing 50 is a thrust bearing disposed between the piston 22 of the second engagement device 2 and the piston drive member 47 in the second direction D2 (in this case, the axial direction L). In the present embodiment, the bearing 50 is supported from both sides in the axial direction L by a pressing member 60 that presses the piston 22 from the second axial side L2 and by the piston drive member 47. The pressing member 60 has a tubular shape having an axis along the axial direction L. In the present embodiment, the bearing 50 and the pressing member 60 are inserted through the tubular member 25 so as to slide on the outer peripheral surface of the tubular member 25 in the axial direction L. In this example, the bearing 50 is a thrust roller bearing.

The piston drive member 47 is a member that drives the piston 22. The piston drive member 47 is formed so as to extend along a specific radial direction R (vertical direction in FIG. 2). A held portion 471 that is pivotally held by the second transmission shaft 46 is provided at one end (upper end in FIG. 2) of the piston drive member 47 in the extending direction. An abutment portion 472 that abuts against the bearing 50 is provided at a part of the piston drive member 47 opposite to the held portion 471 in the extending direction. In the present embodiment, the abutment portion 472 abuts against the bearing 50 from the second axial side L2.

In the present embodiment, the piston drive member 47 is supported so as to be swingable about a fulcrum at a part that abuts against a swing support portion P fixed to a non-rotating member (for example, a case that houses the transmission TM and the like). In the present embodiment, the swing support portion P abuts, from the second axial side L2, against a part of the piston drive member 47 closer to the abutment portion 472 than the middle part in the extending direction. As a result, a force greater than the force applied to the held portion 471 from the second transmission shaft 46 can be applied to the bearing 50 and the pressing member 60 from the abutment portion 472 by using the principle of leverage.

In the present embodiment, when the second transmission shaft 46 moves to the second axial side L2 while the piston drive member 47 is in a posture along the radial direction R, the held portion 471 held by the second transmission shaft 46 moves to the second axial side L2, and the abutment portion 472 moves to the first axial side L1. Thus, the piston drive member 47 is inclined with respect to the radial direction R, and the abutment portion 472 presses the bearing 50 from the second axial side L2. Along with this, the pressing member 60 slides to the first axial side L1 on the tubular member 25 together with the bearing 50 and presses the piston 22 to the first axial side L1 against the urging force of the urging member 22*a*. As a result, the friction member 21 is pressed by the piston 22, and the second engagement device 2 is engaged. Since the bearing 50 is the thrust bearing as described above, the bearing 50 at this time supports, in the axial direction L, the pressing member 60 and the piston drive member 47 supporting the bearing 50 from both sides in the axial direction L so that the pressing member 60 and the piston drive member 47 rotate relative to each other. That is, the bearing 50 relatively supports the piston 22 and the piston drive member 47 in the second direction D2 (in this case, the axial direction L) so that the piston 22 and the piston drive member 47 rotate relative to each other.

As described above, in the present embodiment, the second engagement device 2 includes the friction member 21 and the piston 22 that presses the friction member 21.

It is assumed that the direction along the linear motion of the second transmission mechanism 43 is the second direction D2.

The second transmission mechanism 43 includes the piston drive member 47 that drives the piston 22, and the bearing 50 disposed between the piston 22 and the piston drive member 47 in the second direction D2.

When the second engagement device 2 is engaged, the bearing 50 relatively supports the piston 22 and the piston drive member 47 in the second direction D2 so that the piston 22 and the piston drive member 47 rotate relative to each other.

According to this configuration, the piston 22 can be driven by the piston drive member 47 while the piston 22 and the piston drive member 47 are rotatable relative to each other. Thus, the engagement state of the second engagement device 2 can appropriately be changed with a simple configuration.

When the second transmission shaft 46 in the state in which the abutment portion 472 presses the bearing 50 moves to the first axial side L1, the held portion 471 held by the second transmission shaft 46 moves to the first axial side L1. The abutment portion 472 moves to the second axial side L2 by being pressed via the pressing member 60 and the bearing 50 by the piston 22 urged to the second axial side L2 by the urging member 22*a*. As a result, the piston drive member 47 assumes a posture along the radial direction R, and the second engagement device 2 is disengaged.

As described above, in the present embodiment, the second cam follower 45 of the second cam mechanism 42 is connected to the second transmission shaft 46 via the second elastic member 48. The second transmission shaft 46 is connected to the piston drive member 47 that drives the piston 22 of the second engagement device 2 so that the piston drive member 47 swings about the fulcrum at the part that abuts against the swing support portion P. That is, in the present embodiment, the second transmission mechanism 43 transmits the driving force from the second cam mechanism 42 to the second engagement device 2 via the second elastic member 48.

As described above, in the present embodiment, the first transmission mechanism 33 includes the first elastic member 38 having elasticity in the first direction D1 that is the direction of the linear motion of the first transmission mechanism 33, and transmits the driving force from the first cam mechanism 32 to the first engagement device 1 via the first elastic member 38.

The second transmission mechanism 43 includes the second elastic member 48 having elasticity in the second direction D2 that is the direction of the linear motion of the second transmission mechanism 43, and transmits the driving force from the second cam mechanism 42 to the second engagement device 2 via the second elastic member 48.

According to this configuration, vibration caused by the operation of the first cam mechanism 32 is damped by the first elastic member 38 before reaching the first engagement device 1. As a result, the vibration transmitted from the first drive device 3 to the first engagement device 1 can be reduced. Further, vibration caused by the operation of the second cam mechanism 42 is damped by the second elastic member 48 before reaching the second engagement device 2. As a result, the vibration transmitted from the second drive device 4 to the second engagement device 2 can be reduced.

There may be a case where the intermesh first engagement device 1 is not immediately engaged due to phase mismatch of intermesh portions depending on, for example, the traveling state of the vehicle. According to this configuration, even if the first engagement device 1 is not immediately engaged, it is possible to wait until the first engagement device 1 is engaged by a change in, for example, the traveling state of the vehicle while the driving force from the first cam mechanism 32 remains applied to the first engagement device 1 as the elastic force of the first elastic member 38. Thus, it is easy to appropriately engage the intermesh first engagement device 1.

Figure 3:
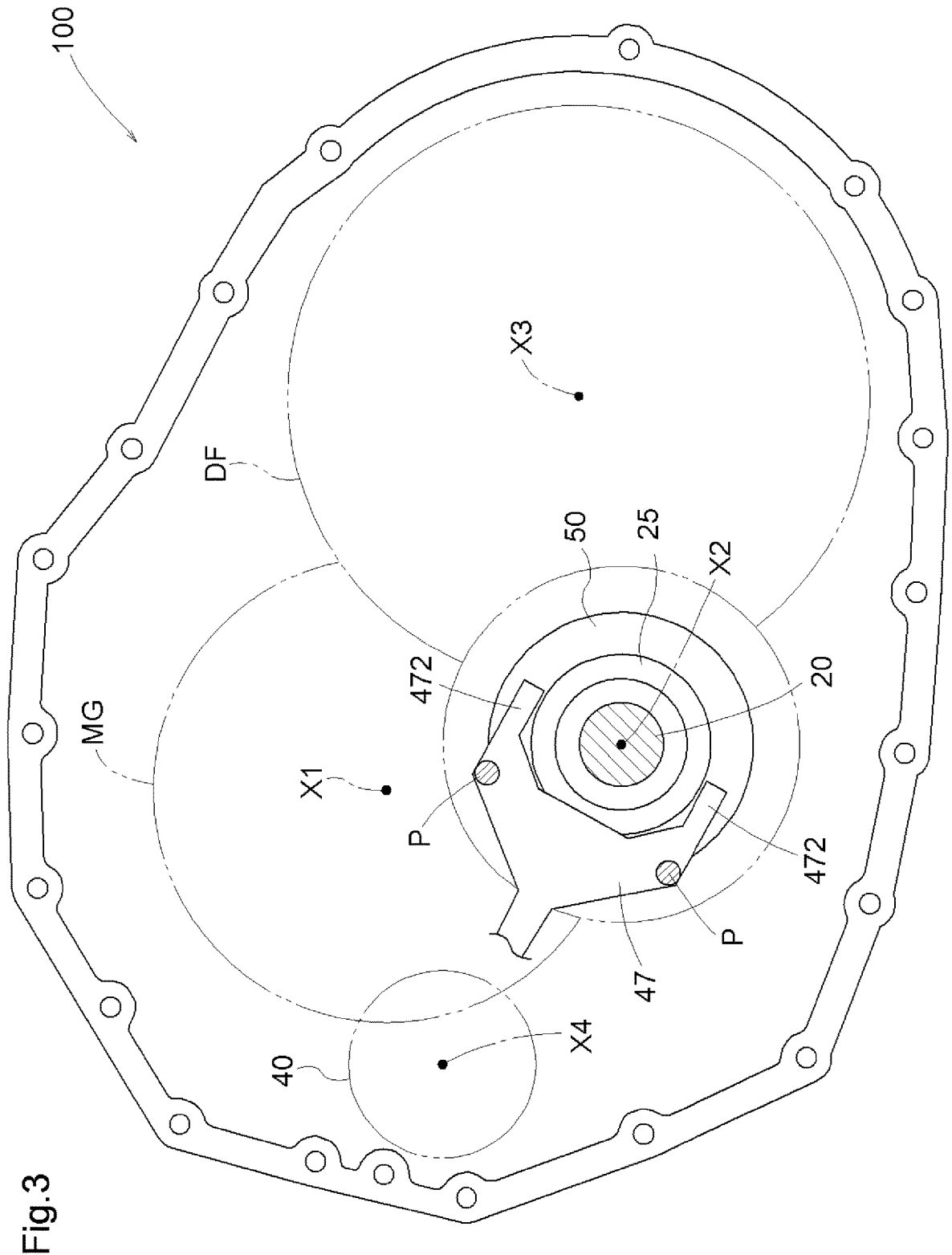
FIG. 3 is a sectional view orthogonal to an axial direction of the vehicle drive transmission device according to the first embodiment.

As shown in FIG. 3, in the present embodiment, the abutment portion 472 has a two-pronged fork shape sandwiching the outer peripheral surface of the tubular member 25 in an axial view along the axial direction L. The swing support portion P abuts against the base of each fork of the abutment portion 472. That is, a pair of swing support portions P is provided in the present embodiment.

Figure 4:
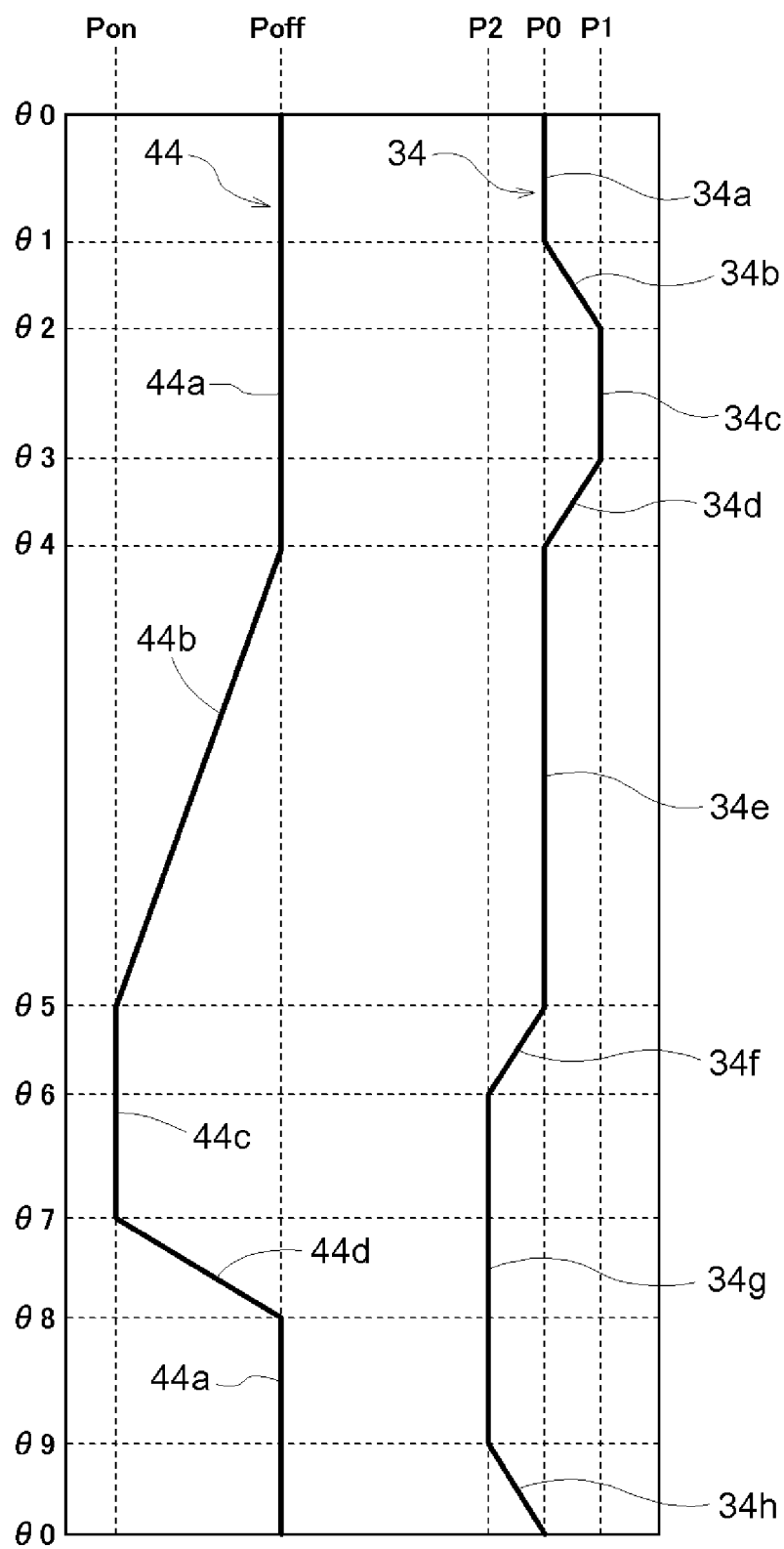
FIG. 4 is a diagram showing configurations of a first cam path and a second cam path according to the first embodiment.

The configurations of the first cam path 34 and the second cam path 44 according to the present embodiment will be described below with reference to FIG. 4. FIG. 4 is a diagram in which the first cam path 34 is developed in a plane along the rotation direction of the first shift drum 31 and the second cam path 44 is developed in a plane along the rotation direction of the second shift drum 41. In FIG. 4, the positional relationship between the first cam path 34 and the second cam path 44 is represented such that the operating position of the first cam mechanism 32 in the rotation direction of the first shift drum 31 agrees with the operating position of the second cam mechanism 42 in the rotation direction of the second shift drum 41. In the present embodiment, the "operating position" of the first cam mechanism 32 is a position of the first guided portion 351 of the first cam follower 35 that is disposed in the groove defining the first cam path 34. The "operating position" of the second cam mechanism 42 is a position of the first guided portion 351 of the first cam follower 35 that is disposed in the groove defining the second cam path 44.

As shown in FIG. 4, in the present embodiment, the first cam path 34 is disposed over the entire circumference of the first shift drum 31. The second cam path 44 is disposed over the entire circumference of the second shift drum 41. In the present embodiment, the first shift drum 31 and the second shift drum 41 are driven to rotate in one direction so that the operating position of the first cam mechanism 32 and the operating position of the second cam mechanism 42 pass through positions θ0 to θ9 in the stated order.

The first cam path 34 includes a first keeping portion 34a that keeps a neutral phase P0, a first transition portion 34b that transitions from the neutral phase P0 to a first phase P1, a second keeping portion 34c that keeps the first phase P1, a second transition portion 34d that transitions from the first phase P1 to the neutral phase P0, a third keeping portion 34e that keeps the neutral phase P0, a third transition portion 34f that transitions from the neutral phase P0 to a second phase P2, a fourth keeping portion 34g that keeps the second phase P2, and a fourth transition portion 34h that transitions from the second phase P2 to the neutral phase P0. The first keeping portion 34a, the first transition portion 34b, the second keeping portion 34c, the second transition portion 34d, the third keeping portion 34e, the third transition portion 34f, the fourth keeping portion 34g, and the fourth transition portion 34h are continuously arranged in the stated order along the rotation direction of the first shift drum 31.

The neutral phase P0, the first phase P1, and the second phase P2 are phases for switching the engagement states of the first engagement device 1 and the third engagement device 5. In the neutral phase P0, the first transmission mechanism 33 disengages both the first engagement device 1 and the third engagement device 5. In the first phase P1, the first transmission mechanism 33 engages the first engagement device 1 and disengages the third engagement device 5. In the second phase P2, the first transmission mechanism 33 disengages the first engagement device 1 and engages the third engagement device 5.

In the present embodiment, the first keeping portion 34a is formed from the position θ0 to the position θ1 in the rotation direction of the first shift drum 31. The first transition portion 34b is formed from the position θ1 to the position θ2 in the rotation direction of the first shift drum 31. The second keeping portion 34c is formed from the position θ2 to the position θ3 in the rotation direction of the first shift drum 31. The second transition portion 34d is formed from the position θ3 to the position θ4 in the rotation direction of the first shift drum 31. The third keeping portion 34e is formed from the position θ4 to the position θ5 in the rotation direction of the first shift drum 31. The third transition portion 34f is formed from the position θ5 to the position θ6 in the rotation direction of the first shift drum 31. The fourth keeping portion 34g is formed from the position θ6 to the position θ9 in the rotation direction of the first shift drum 31. The fourth transition portion 34h is formed from the position θ9 to the position θ0 in the rotation direction of the first shift drum 31.

The second cam path 44 includes a fifth keeping portion 44a that keeps a disengagement phase Poff, a fifth transition portion 44b that transitions from the disengagement phase Poff to an engagement phase Pon, a sixth keeping portion 44c that keeps the engagement phase Pon, and a sixth transition portion 44d that transitions from the engagement phase Pon to the disengagement phase Poff. The fifth keeping portion 44a, the fifth transition portion 44b, the sixth keeping portion 44c, and the sixth transition portion 44d are continuously arranged in the stated order along the rotation direction of the second shift drum 41.

The engagement phase Pon and the disengagement phase Poff are phases for switching the engagement state of the second engagement device 2. In the engagement phase Pon, the second transmission mechanism 43 engages the second engagement device 2. In the disengagement phase Poff, the second transmission mechanism 43 disengages the second engagement device 2.

In the present embodiment, the fifth keeping portion 44a is formed from the position θ0 to the position θ4 and from the position θ8 to the position θ0 in the rotation direction of the second shift drum 41. The fifth transition portion 44b is formed from the position θ4 to the position θ5 in the rotation direction of the second shift drum 41. The sixth keeping portion 44c is formed from the position θ5 to the position θ7 in the rotation direction of the second shift drum 41. The sixth transition portion 44d is formed from the position θ7 to the position θ8 in the rotation direction of the second shift drum 41.

As described above, in the present embodiment, the third keeping portion 34e of the first cam path 34 and the fifth transition portion 44b of the second cam path 44 are disposed from the position θ4 to the position θ5. That is, in the present embodiment, the third keeping portion 34e and the fifth transition portion 44b are disposed to overlap each other in the positional relationship between the first cam path 34 and the second cam path 44 in the case where the operating position of the first cam mechanism 32 in the rotation direction of the first shift drum 31 agrees with the operating position of the second cam mechanism 42 in the rotation direction of the second shift drum 41. The description "the operating position of the first cam mechanism 32 in the rotation direction of the first shift drum 31 agrees with the operating position of the second cam mechanism 42 in the rotation direction of the second shift drum 41" does not necessarily mean that the position of the first guided portion 351 of the first cam follower 35 and the position of the second guided portion 451 of the second cam follower 45 agree with each other in the circumferential direction with respect to the fourth axis X4. Even if the position of the first guided portion 351 of the first cam follower 35 and the position of the second guided portion 451 of the second cam follower 45 differ from each other in the circumferential direction, it is sufficient that the relationship described in the present embodiment is established when the positional relationship between the first cam path 34 and the second cam path 44 is observed under the assumption that these circumferential positions agree with each other.

In the present embodiment, the entire third transition portion 34f and a part including the starting point of the fourth keeping portion 34g in the first cam path 34 and the sixth keeping portion 44c of the second cam path 44 are disposed from the position θ5 to the position θ7. That is, in the present embodiment, the portion corresponding to the entire third transition portion 34f and the part including the starting point of the fourth keeping portion 34g and the sixth keeping portion 44c are disposed to overlap each other in the positional relationship between the first cam path 34 and the second cam path 44 in the case where the operating position of the first cam mechanism 32 in the rotation direction of the first shift drum 31 agrees with the operating position of the second cam mechanism 42 in the rotation direction of the second shift drum 41.

As described above, in the present embodiment, the first cam mechanism 32 includes the first cam path 34 that is provided along the rotation direction of the first shift drum 31 and changes in phase in response to the rotation of the first shift drum 31.

The second cam mechanism 42 includes the second cam path 44 that is provided along the rotation direction of the second shift drum 41 and changes in phase in response to the rotation of the second shift drum 41.

The first transmission mechanism 33 drives the first engagement device 1 and the third engagement device 5 by performing linear motion depending on the phase of the first cam path 34.

The second transmission mechanism 43 drives the second engagement device 2 by performing linear motion depending on the phase of the second cam path 44.

The first cam path 34 includes, in the following stated order along the rotation direction of the first shift drum 31, the first keeping portion 34a that keeps the neutral phase P0, the first transition portion 34b that transitions from the neutral phase P0 to the first phase P1, the second keeping portion 34c that keeps the first phase P1, the second transition portion 34d that transitions from the first phase P1 to the neutral phase P0, the third keeping portion 34e that keeps the neutral phase P0, the third transition portion 34f that transitions from the neutral phase P0 to the second phase P2, the fourth keeping portion 34g that keeps the second phase P2, and the fourth transition portion 34h that transitions from the second phase P2 to the neutral phase P0.

In the neutral phase P0, the first transmission mechanism 33 disengages both the first engagement device 1 and the third engagement device 5.

In the first phase P1, the first transmission mechanism 33 engages the first engagement device 1 and disengages the third engagement device 5.

In the second phase P2, the first transmission mechanism 33 disengages the first engagement device 1 and engages the third engagement device 5.

The second cam path 44 includes, in the following stated order along the rotation direction of the second shift drum 41, the fifth keeping portion 44a that keeps the disengagement phase Poff, the fifth transition portion 44b that transitions from the disengagement phase Poff to the engagement phase Pon, the sixth keeping portion 44c that keeps the engagement phase Pon, and the sixth transition portion 44d that transitions from the engagement phase Pon to the disengagement phase Poff.

In the engagement phase Pon, the second transmission mechanism 43 engages the second engagement device 2.

In the disengagement phase Poff, the second transmission mechanism 43 disengages the second engagement device 2.

The third keeping portion 34e and the fifth transition portion 44b are disposed to overlap each other and the portion corresponding to the entire third transition portion 34f and the part including the starting point of the fourth keeping portion 34g and the sixth keeping portion 44c are disposed to overlap each other in the positional relationship between the first cam path 34 and the second cam path 44 in the case where the operating position of the first cam mechanism 32 in the rotation direction of the first shift drum 31 agrees with the operating position of the second cam mechanism 42 in the rotation direction of the second shift drum 41.

According to this configuration, the first cam path 34 includes the first keeping portion 34a, the first transition portion 34b, the second keeping portion 34c, the second transition portion 34d, the third keeping portion 34e, the third transition portion 34f, the fourth keeping portion 34g, and the fourth transition portion 34h in the stated order along the rotation direction of the first shift drum 31. The second cam path 44 includes the fifth keeping portion 44a, the fifth transition portion 44b, the sixth keeping portion 44c, and the sixth transition portion 44d in the stated order along the rotation direction of the second shift drum 41. As a result, the shift speed of the transmission TM can appropriately be switched between the first shift speed and the second shift speed by simply rotating the drive shaft 40a in one direction.

When the intermesh first engagement device 1 is transmitting the traveling driving force between the input member I and the output member O, the first drive device 3 attempting to disengage the first engagement device 1 may fail to disengage the first engagement device 1 because the first engagement device 1 cannot be unmeshed. According to this configuration, the third keeping portion 34e of the first cam path 34 and the fifth transition portion 44b of the second cam path 44 are disposed to overlap each other in the positional relationship between the first cam path 34 and the second cam path 44 in the case where the operating position of the first cam mechanism 32 in the rotation direction of the first shift drum 31 agrees with the operating position of the second cam mechanism 42 in the rotation direction of the second shift drum 41. Therefore, the first cam mechanism 32 waits while applying the driving force in the direction in which the first engagement device 1 is disengaged, and the engagement force of the frictional second engagement device 2 is gradually increased. Thus, the transmission path of the traveling driving force between the input member I and the output member O can gradually be shifted from the path via the first engagement device 1 to the path via the second engagement device 2. When the transmission ratio of the traveling driving force from the second engagement device 2 is equal to or larger than a predetermined level and the traveling driving force transmitted via the first engagement device 1 decreases, the first engagement device 1 is disengaged automatically. As a result, it is possible to smoothly shift from the first shift speed to the second shift speed while avoiding interruption of the power transmission between the input member I and the output member O.

According to this configuration, the portion corresponding to the entire third transition portion 34*f* and the part including the starting point of the fourth keeping portion 34*g* in the first cam path 34 and the sixth keeping portion 44*c* of the second cam path 44 are disposed to overlap each other in the positional relationship between the first cam path 34 and the second cam path 44 in the case where the operating position of the first cam mechanism 32 in the rotation direction of the first shift drum 31 agrees with the operating position of the second cam mechanism 42 in the rotation direction of the second shift drum 41. Therefore, even after the phase of the first cam path 34 changes to the second phase P2 for engaging the third engagement device 5, the phase of the second cam path 44 remains, for a predetermined period, the engagement phase Pon for engaging the second engagement device 2. As a result, even if the intermesh third engagement device 5 is not immediately engaged due to phase mismatch of intermesh portions, the engagement state of the second engagement device 2 can be maintained. Thus, the interruption of the power transmission between the input member I and the output member O can be avoided. Further, determination can be made as to whether the third engagement device 5 is appropriately engaged during a period in which the phase of the second cam path 44 remains the engagement phase Pon after the phase of the first cam path 34 has changed to the second phase P2. This determination can be made, for example, by using a sensor that detects the position of the first transmission shaft 36 or the shift fork 37 in the first direction D1.

An example of the operation of the transmission TM according to the present embodiment will be described below with reference to FIGS. 5 to 10. FIG. 2 used in the above description shows the transmission TM in a state in which the operating position of the first cam mechanism 32 (the position of the first guided portion 351 in the first cam path 34) is in the first keeping portion 34*a* of the first cam path 34 and the operating position of the second cam mechanism 42 (the position of the second guided portion 451 in the second cam path 44) is in the fifth keeping portion 44*a* of the second cam path 44 (state in which the operating position of the first cam mechanism 32 and the operating position of the second cam mechanism 42 are between the position θ0 and the position θ1.

Figure 5:
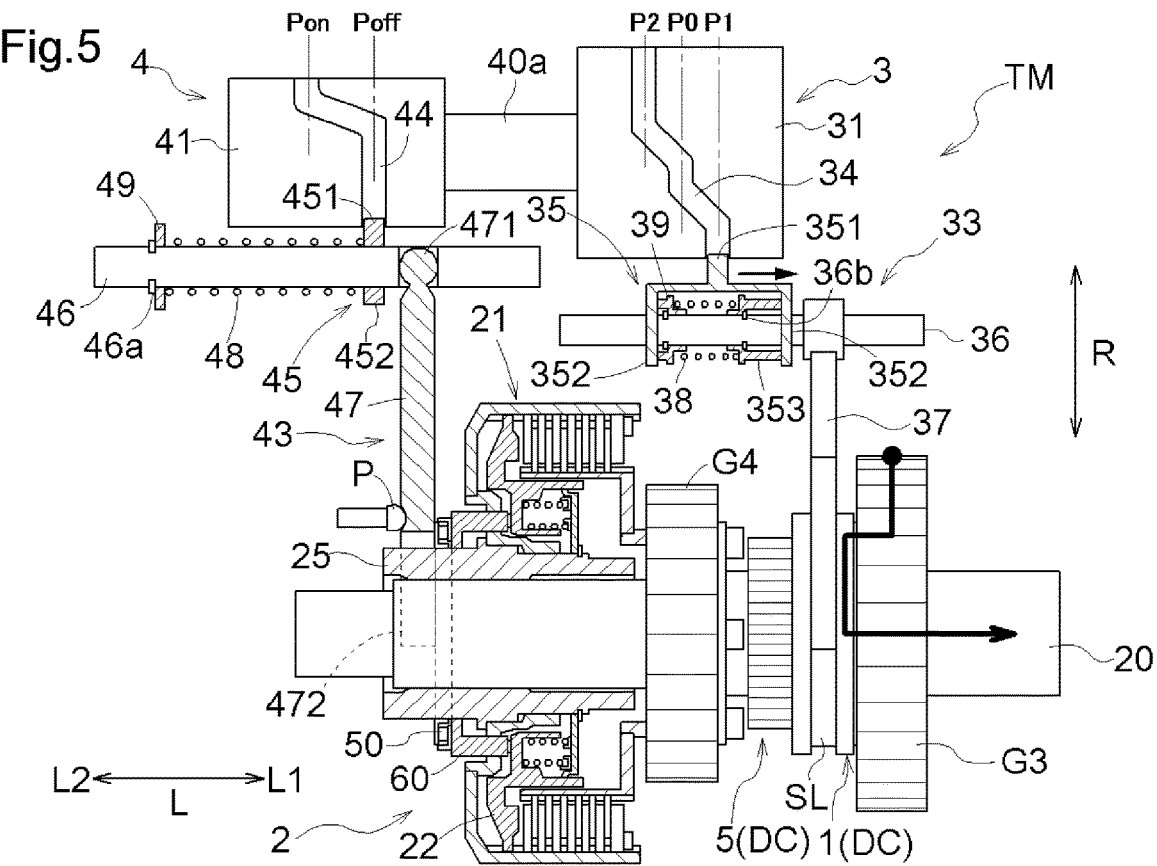
FIG. 5 is a diagram showing an operation of the transmission according to the first embodiment.

FIG. 5 shows the transmission TM in a state in which the first shift drum 31 and the second shift drum 41 have further rotated from the state shown in FIG. 2. Specifically, FIG. 5 shows a state in which the operating position of the first cam mechanism 32 is in the second keeping portion 34*c* of the first cam path 34 and the operating position of the second cam mechanism 42 is in the fifth keeping portion 44*a* of the second cam path 44 (state in which the operating position of the first cam mechanism 32 and the operating position of the second cam mechanism 42 are between the position θ2 and the position θ3).

As shown in FIG. 5, the first cam follower 35 moves to the first axial side L1 as the first shift drum 31 rotates and the phase of the first cam path 34 changes from the neutral phase P0 to the first phase P1. Along with this, the support portion 353 pressed to the first axial side L1 by the first support member 39 via the first elastic member 38 presses the first transmission shaft 36 to the first axial side L1 via the second restriction portion 36*b*. Therefore, the shift fork 37 connected to the first transmission shaft 36 moves to the first axial side L1 to move the switching member SL to the first axial side L1. As a result, the first engagement device 1 is engaged while the third engagement device 5 remains disengaged. At this time, the second engagement device 2 remains disengaged because the phase of the second cam path 44 remains the disengagement phase Poff. In this way, the first engagement device 1 transmits the traveling driving force between the input member I and the output member O, and the first shift speed is formed in the transmission TM. The arrow shown on the engagement device in FIG. 5 indicates a transmission path of the traveling driving force, and the same applies to FIGS. 6 to 10.

Figure 6:
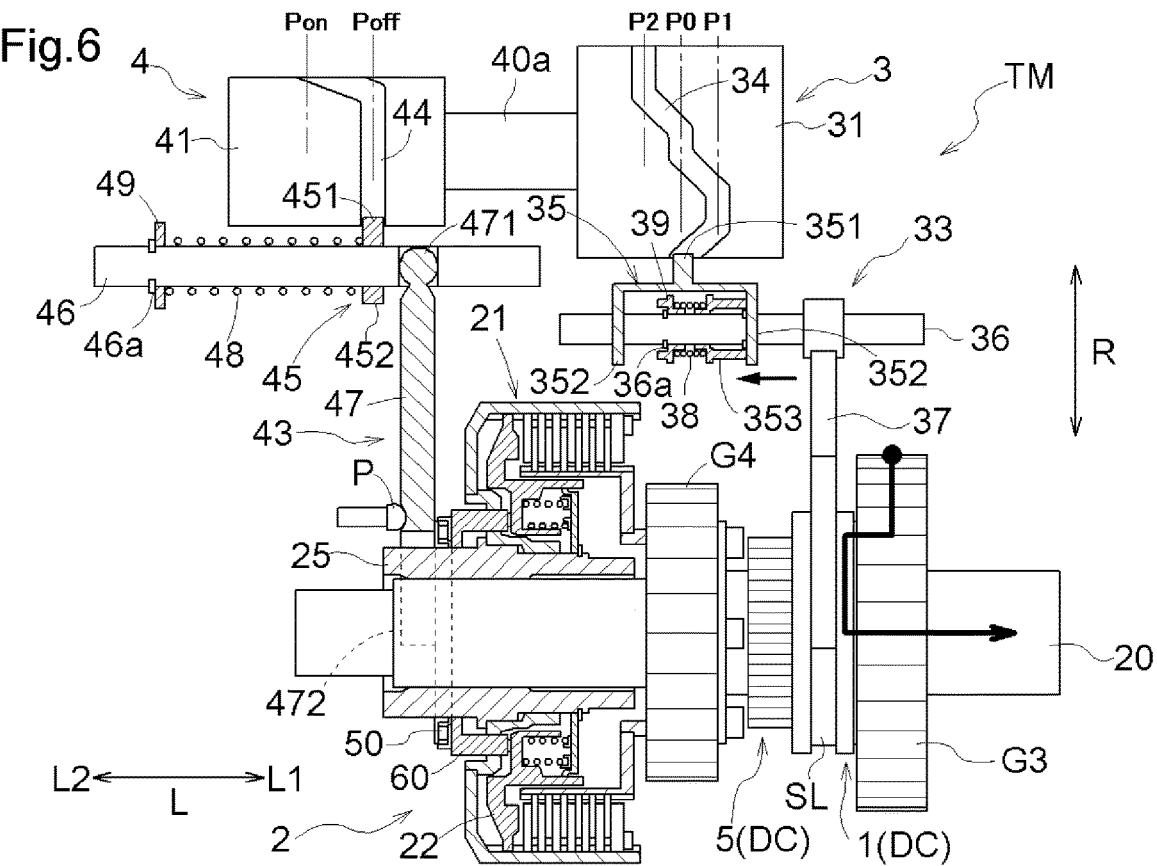
FIG. 6 is a diagram showing the operation of the transmission according to the first embodiment.

FIG. 6 shows the transmission TM in a state in which the first shift drum 31 and the second shift drum 41 have further rotated from the state shown in FIG. 5. Specifically, FIG. 6 shows a state in which the operating position of the first cam mechanism 32 is in the second transition portion 34*d* of the first cam path 34 and the operating position of the second cam mechanism 42 is in the fifth keeping portion 44*a* of the second cam path 44 (state in which the operating position of the first cam mechanism 32 and the operating position of the second cam mechanism 42 are between the position θ3 and the position θ4).

As shown in FIG. 6, the first cam follower 35 moves to the second axial side L2 as the first shift drum 31 rotates and the phase of the first cam path 34 changes from the first phase P1 to the neutral phase P0. Along with this, the first support member 39 pressed to the second axial side L2 by the support portion 353 via the first elastic member 38 presses the first transmission shaft 36 to the second axial side L2 via the first restriction portion 36*a*. In this example, however, it is assumed that the driving force is transmitted from the rotary electric machine MG to the output member O and the vehicle is traveling. The first engagement device 1 transmits a relatively large driving force via the intermesh portions between the switching member SL and the first engagement teeth T1. Therefore, the urging force of the first elastic member 38 cannot unmesh the first engagement device 1, and the first transmission shaft 36 does not move to the second axial side L2. Thus, the first support member 39 whose movement to the second axial side L2 is restricted by the first restriction portion 36*a* does not move to the second axial side L2. At this time, the first elastic member 38 is compressed in the axial direction Las the support portion 353 moves to the second axial side L2 relative to the first support member 39. Thus, in this example, the first engagement device 1 remains engaged even if the first cam follower 35 moves to the second axial side L2 as the phase of the first cam path 34 changes from the first phase P1 to the neutral phase P0.

Figure 7:
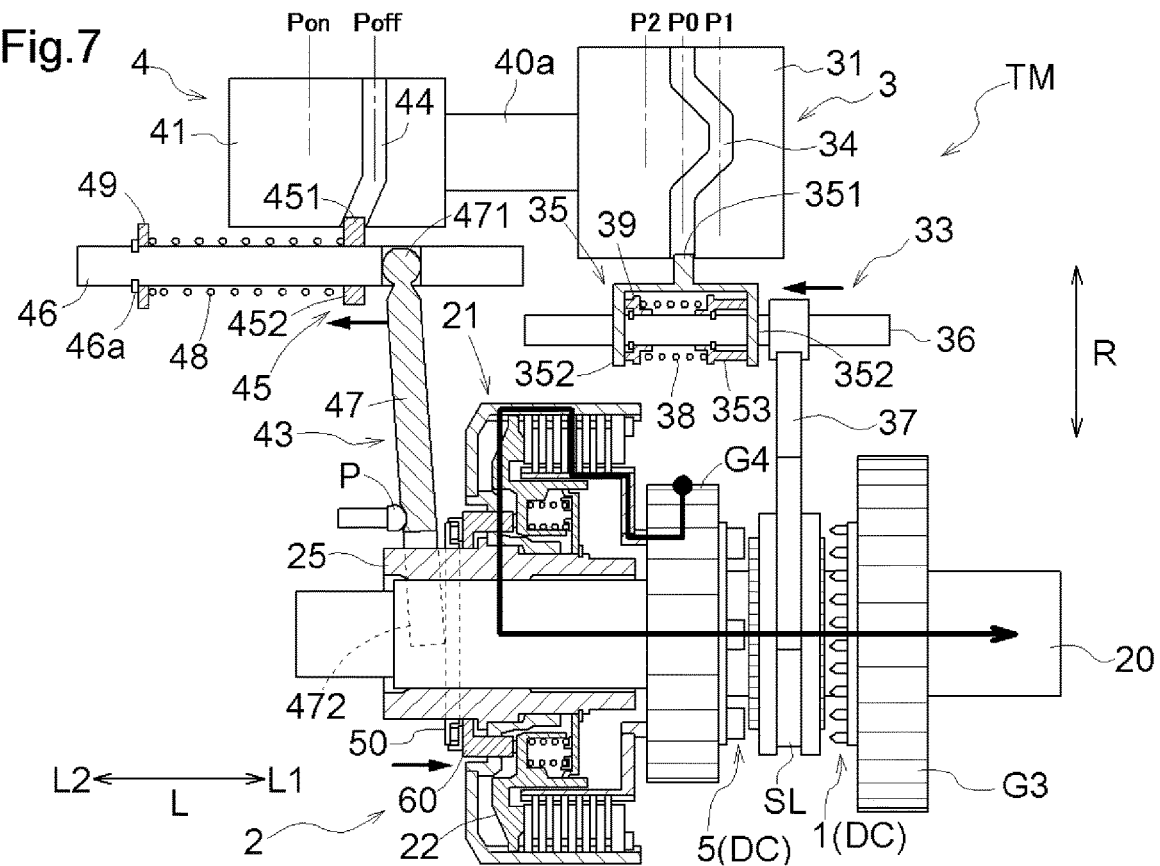
FIG. 7 is a diagram showing the operation of the transmission according to the first embodiment.

FIG. 7 shows the transmission TM in a state in which the first shift drum 31 and the second shift drum 41 have further rotated from the state shown in FIG. 6. Specifically, FIG. 7 shows a state in which the operating position of the first cam mechanism 32 is in the third keeping portion 34*e* of the first cam path 34 and the operating position of the second cam mechanism 42 is in the fifth transition portion 44*b* of the second cam path 44 (state in which the operating position of the first cam mechanism 32 and the operating position of the second cam mechanism 42 are between the position θ4 and the position θ5).

As shown in FIG. 7, the second cam follower 45 moves to the second axial side L2 as the second shift drum 41 rotates and the phase of the second cam path 44 changes from the disengagement phase Poff to the engagement phase Pon. Along with this, the second support member 49 pressed to the second axial side L2 by the second sliding portion 452 via the second elastic member 48 presses the second transmission shaft 46 to the second axial side L2 via the restriction portion 46a. Therefore, the piston drive member 47 swings about the fulcrum at the part supported by the swing support portion P so that the held portion 471 held by the second transmission shaft 46 moves to the second axial side L2 and the abutment portion 472 moves to the first axial side L1. As a result, the abutment portion 472 of the piston drive member 47 presses the piston 22 of the second engagement device 2 to the first axial side L1 via the bearing 50 and the pressing member 60, thereby engaging the second engagement device 2. As shown in FIG. 4, the fifth transition portion 44b is formed such that the phase gradually changes from the disengagement phase Poff to the engagement phase Pon along the rotation direction of the second shift drum 41. Therefore, the force with which the piston 22 presses the friction member 21 gradually increases along the rotation direction of the second shift drum 41, and the engagement force of the second engagement device 2 gradually increases in the slipping engaged state.

At this time, the phase of the first cam path 34 remains the neutral phase P0, but the first engagement device 1 is not unmeshed as described above. Therefore, when the engagement force of the frictional second engagement device 2 gradually increases as described above as the second cam follower 45 moves to the second axial side L2, the transmission path of the traveling driving force between the input member I and the output member O is gradually shifted from the path via the first engagement device 1 to the path via the second engagement device 2. When the transmission ratio of the traveling driving force from the second engagement device 2 is equal to or larger than the predetermined level and the traveling driving force transmitted via the first engagement device 1 decreases, the shift fork 37 holding the switching member SL moves to the second axial side L2 by the urging force of the first elastic member 38, and the first engagement device 1 is disengaged automatically. In this way, the second engagement device 2 transmits the traveling driving force between the input member I and the output member O, and the second shift speed is formed in the transmission TM.

Figure 8:
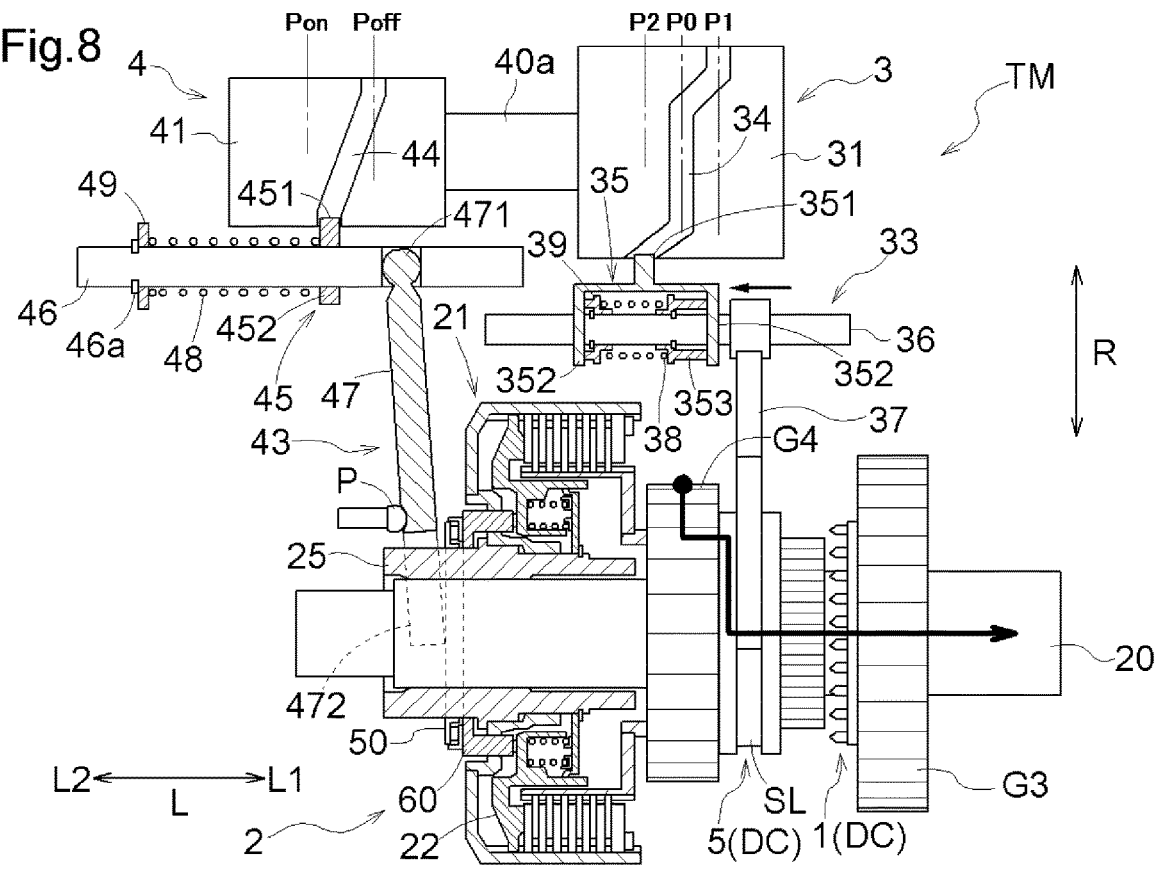
FIG. 8 is a diagram showing the operation of the transmission according to the first embodiment.

FIG. 8 shows the transmission TM in a state in which the first shift drum 31 and the second shift drum 41 have further rotated from the state shown in FIG. 7. Specifically, FIG. 8 shows a state in which the operating position of the first cam mechanism 32 is in the third transition portion 34f of the first cam path 34 and the operating position of the second cam mechanism 42 is in the sixth keeping portion 44c of the second cam path 44 (state in which the operating position of the first cam mechanism 32 and the operating position of the second cam mechanism 42 are between the position θ5 and the position θ6).

As shown in FIG. 8, the first cam follower 35 moves to the second axial side L2 as the first shift drum 31 rotates and the phase of the first cam path 34 changes from the neutral phase P0 to the second phase P2. Along with this, the first support member 39 pressed to the second axial side L2 by the support portion 353 via the first elastic member 38 presses the first transmission shaft 36 to the second axial side L2 via the first restriction portion 36a. Therefore, the shift fork 37 connected to the first transmission shaft 36 moves to the second axial side L2 to move the switching member SL to the second axial side L2. As a result, the third engagement device 5 is engaged while the first engagement device 1 remains disengaged. At this time, the second engagement device 2 remains engaged because the phase of the second cam path 44 remains the engagement phase Pon. In this way, the second engagement device 2 and the third engagement device 5 transmit the traveling driving force between the input member I and the output member O, and the second shift speed is maintained in the transmission TM.

Figure 9:
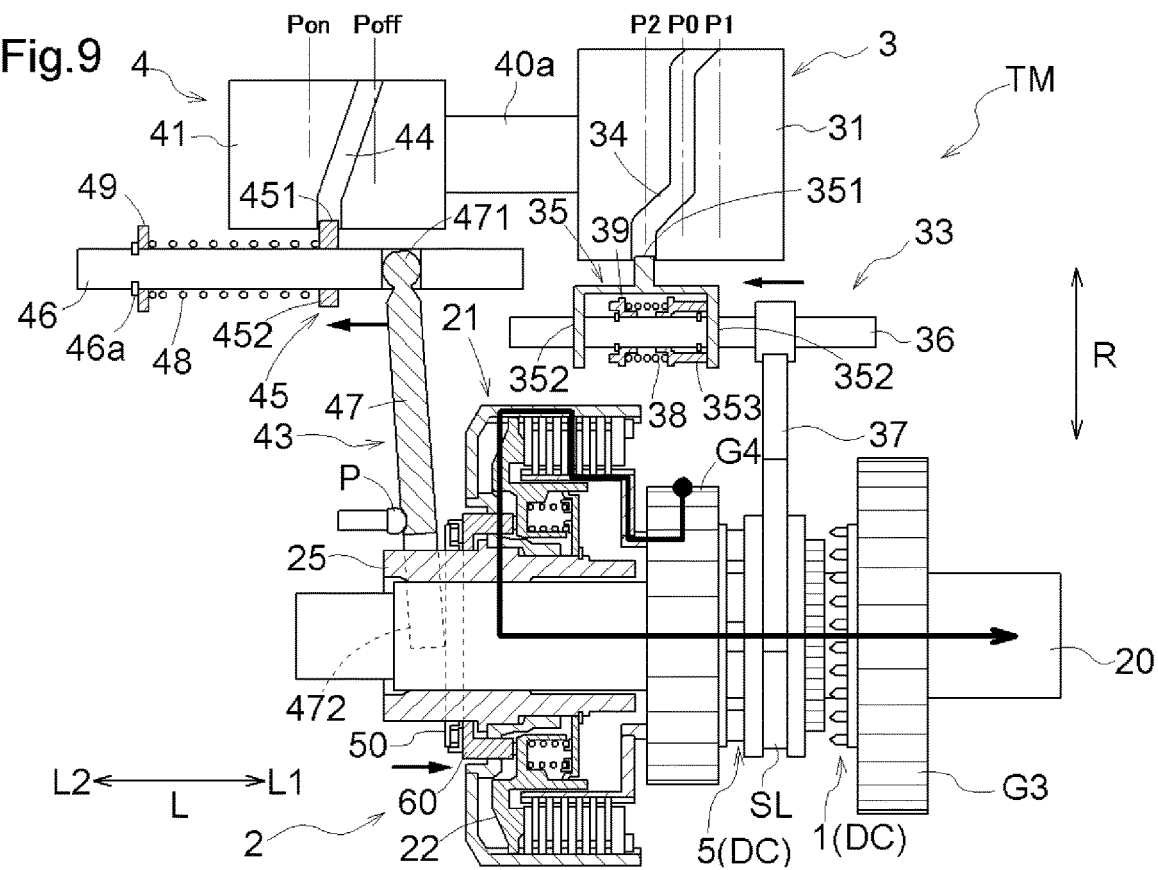
FIG. 9 is a diagram showing the operation of the transmission according to the first embodiment.

As shown in FIG. 9, even if the first cam follower 35 moves to the second axial side L2 as the phase of the first cam path 34 changes from the neutral phase P0 to the second phase P2, there is a case where the intermesh portions of the intermesh third engagement device 5 (intermesh portions between the switching member SL and the second engagement teeth T2) fail to intermesh appropriately and the engaged state is not established. Even in such a case, however, the second engagement device 2 remains engaged, and therefore the vehicle can travel appropriately while maintaining the second shift speed until the third engagement device 5 is engaged by intermeshing appropriately.

Figure 10:
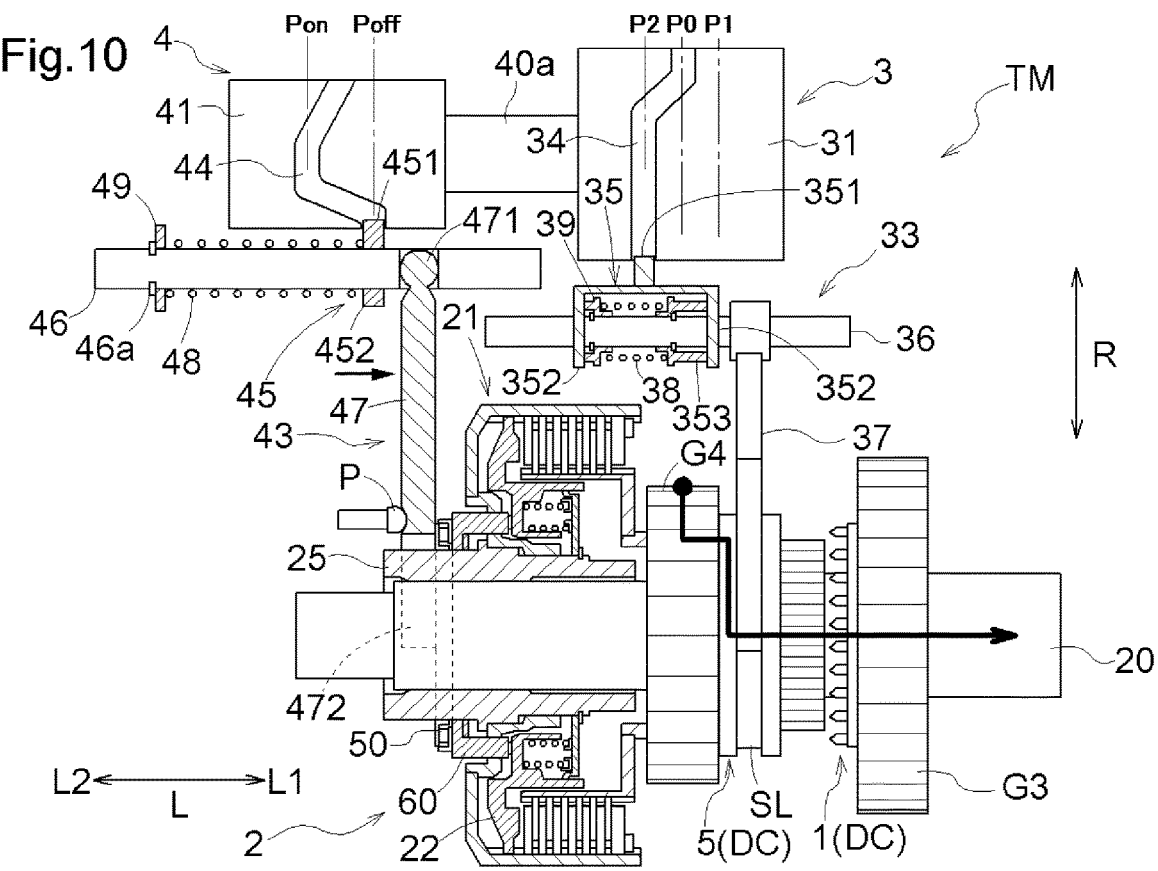
FIG. 10 is a diagram showing the operation of the transmission according to the first embodiment.

FIG. 10 shows the transmission TM in a state in which the first shift drum 31 and the second shift drum 41 have further rotated from the state shown in FIG. 8. Specifically, FIG. 10 shows a state in which the operating position of the first cam mechanism 32 is in the fourth keeping portion 34g of the first cam path 34 and the operating position of the second cam mechanism 42 is in the fifth keeping portion 44a of the second cam path 44 (state in which the operating position of the first cam mechanism 32 and the operating position of the second cam mechanism 42 are between the position θ8 and the position θ9).

As shown in FIG. 10, the second cam follower 45 moves to the first axial side L1 as the second shift drum 41 rotates and the phase of the second cam path 44 changes from the engagement phase Pon to the disengagement phase Poff. Along with this, the second support member 49 pressed to the second axial side L2 by the second sliding portion 452 via the second elastic member 48 terminates the pressing of the second transmission shaft 46 to the second axial side L2 via the restriction portion 46a. Therefore, the abutment portion 472 of the piston drive member 47 is pressed to the second axial side L2 by the piston 22 of the second engagement device 2 via the bearing 50 and the pressing member 60. As a result, the piston drive member 47 swings about the fulcrum at the part supported by the swing support portion P so that the held portion 471 held by the second transmission shaft 46 moves to the second axial side L2 and the abutment portion 472 moves to the first axial side L1. When the piston 22 moves to the second axial side L2, the second engagement device 2 is disengaged. At this time, the third engagement device 5 remains engaged because the phase of the first cam path 34 remains the second phase P2. In this way, the third engagement device 5 transmits the traveling driving force between the input member I and the output member O, and the second shift speed is maintained in the transmission TM.

When the first shift drum 31 and the second shift drum 41 further rotate from the state shown in FIG. 10, the transmission TM returns to the state shown in FIG. 2.

2. Second Embodiment

Hereinafter, a vehicle drive transmission device 100 according to a second embodiment will be described with reference to FIGS. 11 and 12. In the present embodiment, the configurations of the engagement devices are different from those in the first embodiment. In the present embodiment, the configurations of the cam paths are different from those in the first embodiment. The differences from the first embodiment will mainly be described below. Points that are not particularly described are the same as those in the first embodiment.

Figure 11:
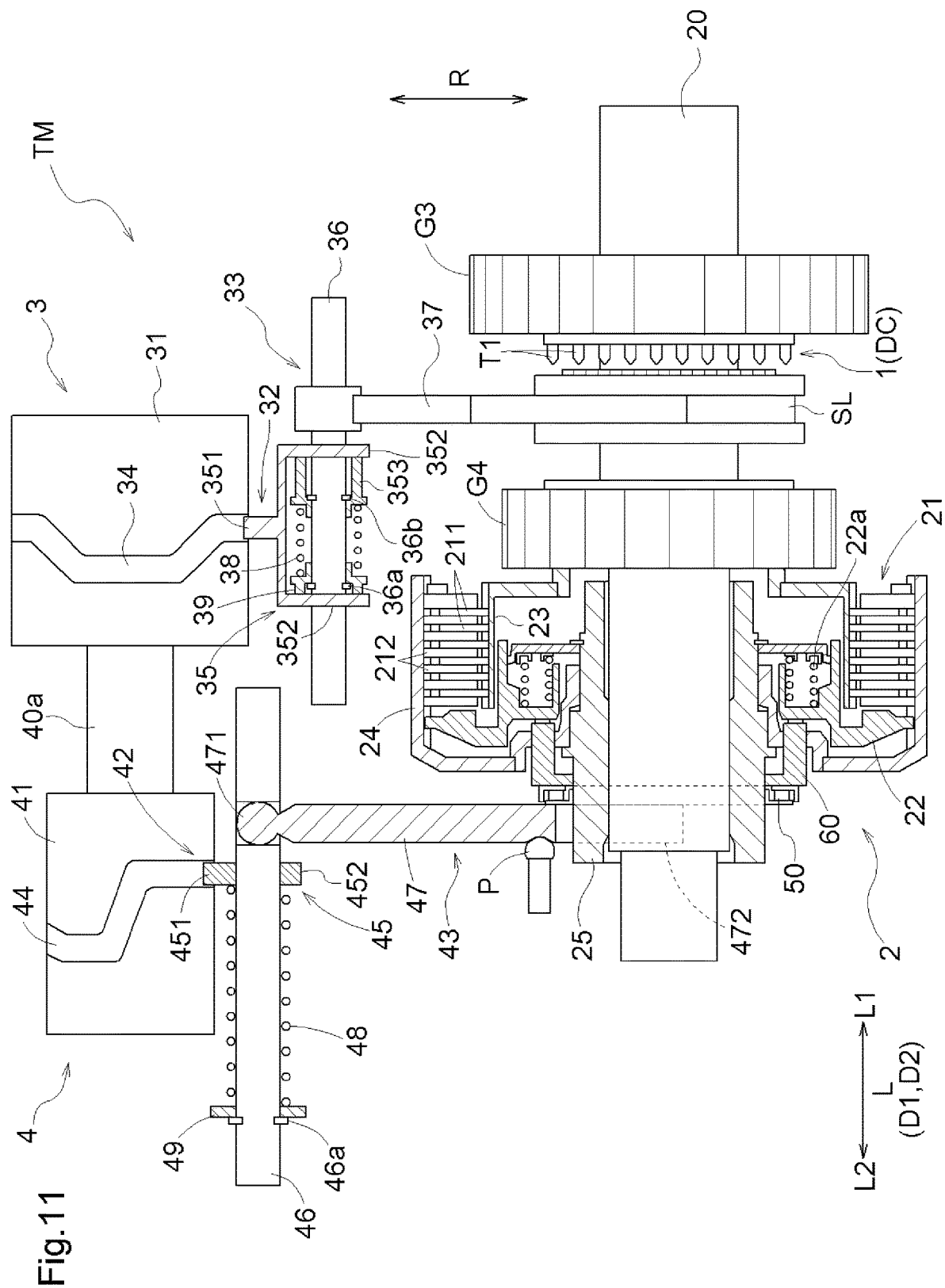
FIG. 11 is a diagram showing a transmission of a vehicle drive transmission device according to a second embodiment.

As shown in FIG. 11, the third engagement device 5 is not provided in the present embodiment. Therefore, in the present embodiment, the second shift speed is formed when the first engagement device 1 is disengaged and the second engagement device 2 is engaged. Thus, in the present embodiment, the second shift speed is formed without using the intermesh third engagement device 5. Therefore, it is necessary to constantly maintain the engagement force of the frictional second engagement device 2 while the second shift speed is formed. Such an engagement force of the second engagement device 2 is applied to the pressing member 60 by the second cam mechanism 42 and the second elastic member 48. In the present embodiment, there is no such case that the third engagement device 5 is not engaged without intermeshing appropriately when the second shift speed is formed. When switching the second shift speed to the first shift speed, the step of disengaging the engaged third engagement device 5 can be omitted. Thus, the period required for the shifting can be shortened. Also in the present embodiment, the first shift speed is formed when the first engagement device 1 is engaged and the second engagement device 2 is disengaged.

Figure 12:
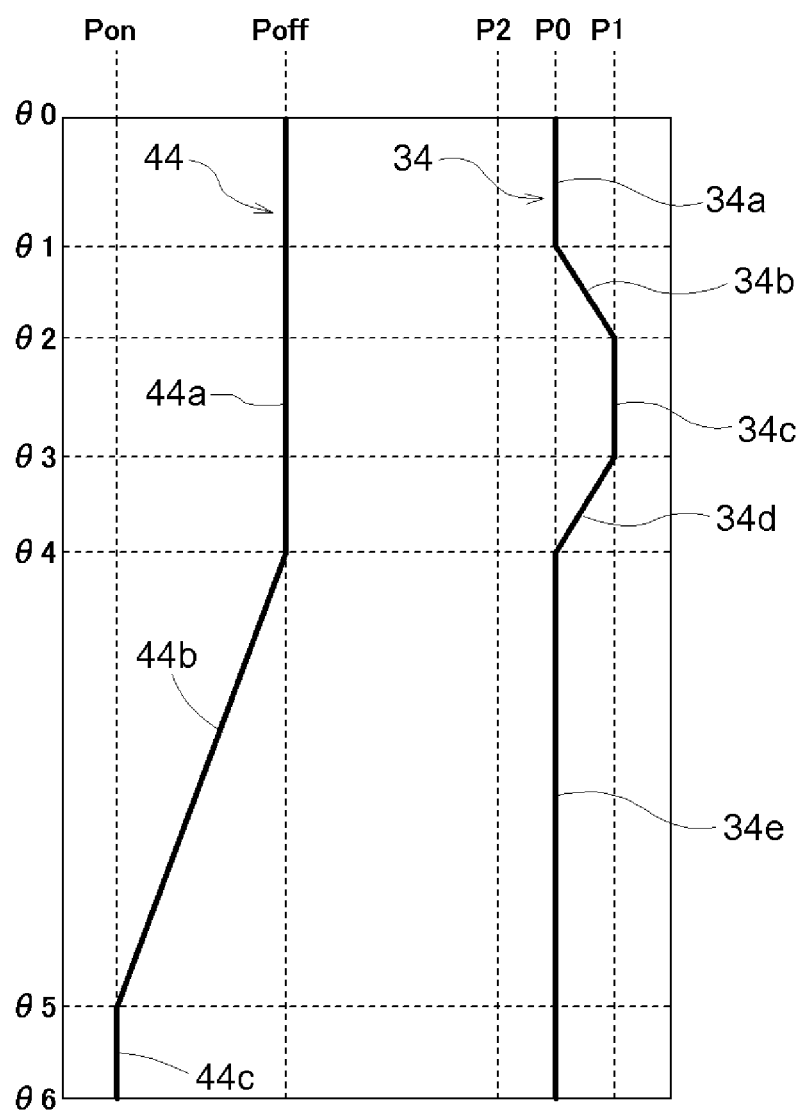
FIG. 12 is a diagram showing configurations of a first cam path and a second cam path according to the second embodiment.

As shown in FIG. 12, in the present embodiment, the first cam path 34 is disposed in a partial area of the first shift drum 31 in the circumferential direction. The second cam path 44 is disposed in a partial area of the second shift drum 41 in the circumferential direction. That is, in the present embodiment, each of the first cam path 34 and the second cam path 44 has a starting end and a terminal end. In the present embodiment, the first shift drum 31 and the second shift drum 41 are driven to rotate in two directions so that the operating position of the first cam mechanism 32 and the operating position of the second cam mechanism 42 pass through positions θ0 to θ6 in the stated order and pass through the positions θ6 to θ0 in the stated order.

In the present embodiment, the first cam path 34 differs from that in the first embodiment in that the third transition portion 34f, the fourth keeping portion 34g, and the fourth transition portion 34h are not provided. In the present embodiment, the first keeping portion 34a is formed from the position θ0 to the position θ1 in the rotation direction of the first shift drum 31. The first transition portion 34b is formed from the position θ1 to the position θ2 in the rotation direction of the first shift drum 31. The second keeping portion 34c is formed from the position θ2 to the position θ3 in the rotation direction of the first shift drum 31. The second transition portion 34d is formed from the position θ3 to the position θ4 in the rotation direction of the first shift drum 31. The third keeping portion 34e is formed from the position θ4 to the position θ6 in the rotation direction of the first shift drum 31.

In the present embodiment, the second cam path 44 differs from that in the first embodiment in that the sixth transition portion 44d is not provided. In the present embodiment, the fifth keeping portion 44a is formed from the position θ0 to the position θ4 in the rotation direction of the second shift drum 41. The fifth transition portion 44b is formed from the position θ4 to the position θ5 in the rotation direction of the second shift drum 41. The sixth keeping portion 44c is formed from the position θ5 to the position θ6 in the rotation direction of the second shift drum 41.

3. Other Embodiments (1) In the above embodiments, description has been given of the exemplary configuration in which the first transmission mechanism 33 includes the first elastic member 38 and the second transmission mechanism 43 includes the second elastic member 48. However, the present disclosure is not limited to such a configuration. At least one of the first transmission mechanism 33 and the second transmission mechanism 43 may omit the elastic member.

(2) In the above embodiments, description has been given of the exemplary configuration in which each of the first elastic member 38 and the second elastic member 48 is the compression coil spring. However, the present disclosure is not limited to such a configuration. For example, various elastic members such as a helical extension spring, a disc spring, and a washer made of rubber or synthetic resin can be used as the elastic member in addition to the compression coil spring.

(3) In the above embodiments, description has been given of the exemplary configuration in which the abutment portion 472 of the piston drive member 47 presses the piston 22 of the second engagement device 2 via the bearing 50 and the pressing member 60. However, the present disclosure is not limited to such a configuration. For example, the bearing 50 may be omitted and the abutment portion 472 of the piston drive member 47 may press the piston 22 via the pressing member 60. Alternatively, the abutment portion 472 of the piston drive member 47 may directly press the piston 22.

(4) In the first and second embodiments, the configurations of the first cam path 34 and the second cam path 44 described with reference to FIGS. 4 and 12 are merely examples. The configuration of each cam path can be changed as appropriate depending on, for example, traveling modes to be realized by the vehicle drive transmission device 100 and the transition order of the traveling modes.

(5) The configurations disclosed in the above embodiments can be applied in combination with the configurations disclosed in other embodiments as long as there is no contradiction. Regarding the other configurations, the embodiments disclosed herein are merely illustrative in all respects. Therefore, various modifications can be made as appropriate without departing from the spirit of the present disclosure.

Outline of Embodiments Described Above

Hereinafter, the outline of the vehicle drive transmission device (100) described above will be described.

A vehicle drive transmission device (100) includes:
an input member (I) drivingly connected to a driving force source (MG) for a wheel;
an output member (O) drivingly connected to the wheel; and
a transmission (TM) configured to form a plurality of shift speeds including a first shift speed and a second shift speed having a smaller speed ratio than the first shift speed, and to change a speed of rotation transmitted from a side of the input member (I) at a speed ratio corresponding to a formed shift speed among the plurality of shift speeds and transmit the rotation to a side of the output member (O), in which
the transmission (TM) includes an intermesh first engagement device (1), a frictional second engagement device (2), a first drive device (3) configured to drive the first engagement device (1), and a second drive device (4) configured to drive the second engagement device (2),
the first shift speed is formed when the first engagement device (1) is engaged and the second engagement device (2) is disengaged, and the second shift speed is formed when the first engagement device (1) is disengaged and the second engagement device (2) is engaged, the first drive device (3) includes a rotatably supported first shift drum (31), a first cam mechanism (32) configured to convert rotational motion of the first shift drum (31) into linear motion, and a first transmission mechanism (33) configured to perform linear motion by the first cam mechanism (32), the second drive device (4) includes a rotatably supported second shift drum (41), a second cam mechanism (42) configured to convert rotational motion of the second shift drum (41) into linear motion, and a second transmission mechanism (43) configured to perform linear motion by the second cam mechanism (42), the first shift drum (31) and the second shift drum (41) are connected so as to rotate integrally with each other via a drive shaft (40*a*), and a drum drive source (40) is provided to drive the drive shaft (40*a*) to rotate the first shift drum (31) and the second shift drum (41).

Further, a vehicle drive transmission device (100) includes:

an input member (I) drivingly connected to a driving force source (MG) for a wheel;

an output member (O) drivingly connected to the wheel; and a transmission (TM) configured to form a plurality of shift speeds including a first shift speed and a second shift speed having a smaller speed ratio than the first shift speed, and to change a speed of rotation transmitted from a side of the input member (I) at a speed ratio corresponding to a formed shift speed among the plurality of shift speeds and transmit the rotation to a side of the output member (O), in which the transmission (TM) includes an intermesh first engagement device (1), a frictional second engagement device (2), an intermesh third engagement device (5), a first drive device (3) configured to drive the first engagement device (1), and a second drive device (4) configured to drive the second engagement device (2), the first shift speed is formed when the first engagement device (1) is engaged and both the second engagement device (2) and the third engagement device (5) are disengaged, and the second shift speed is formed when the first engagement device (1) is disengaged and at least one of the second engagement device (2) and the third engagement device (5) is engaged, the first drive device (3) includes a rotatably supported first shift drum (31), a first cam mechanism (32) configured to convert rotational motion of the first shift drum (31) into linear motion, and a first transmission mechanism (33) configured to perform linear motion by the first cam mechanism (32), the second drive device (4) includes a rotatably supported second shift drum (41), a second cam mechanism (42) configured to convert rotational motion of the second shift drum (41) into linear motion, and a second transmission mechanism (43) configured to perform linear motion by the second cam mechanism (42), the first shift drum (31) and the second shift drum (41) are connected so as to rotate integrally with each other via a drive shaft (40*a*), and a drum drive source (40) is provided to drive the drive shaft (40*a*) to rotate the first shift drum (31) and the second shift drum (41).

According to these configurations, the first shift drum (31) of the first drive device (3) that drives the first engagement device (1) and the second shift drum (41) of the second drive device (4) that drives the second engagement device (2) are connected so as to rotate integrally with each other via the drive shaft (40*a*) driven by the drum drive source (40). Therefore, the two engagement devices (1, 2) of different types for forming and switching the shift speeds in the transmission (TM) can be driven by the drive of the single drum drive source (40). Thus, the number of components can be reduced as compared with a configuration in which the drive devices are provided independently for the intermesh first engagement device (1) and the frictional second engagement device (2). As a result, it is easy to suppress an increase in the size and cost of the vehicle drive transmission device (100).

According to these configurations, the frictional second engagement device (2) is engaged when switching the shift speed of the transmission (TM) from the first shift speed to the second shift speed. Therefore, it is possible to avoid the interruption of the power transmission between the input member (I) and the output member (O) when the engaged intermesh first engagement device (1) is disengaged. Thus, it is possible to suppress fluctuation in the wheel driving force that occurs when the shift speed of the transmission (TM) is switched from the first shift speed to the second shift speed.

It is preferable that the first transmission mechanism (33) include a first elastic member (38) having elasticity in a direction of the linear motion of the first transmission mechanism (33), and be configured to transmit a driving force from the first cam mechanism (32) to the first engagement device (1) via the first elastic member (38), and the second transmission mechanism (43) include a second elastic member (48) having elasticity in a direction of the linear motion of the second transmission mechanism (43), and be configured to transmit a driving force from the second cam mechanism (42) to the second engagement device (2) via the second elastic member (48).

According to this configuration, vibration caused by the operation of the first cam mechanism (32) is damped by the first elastic member (38) before reaching the first engagement device (1). As a result, the vibration transmitted from the first drive device (3) to the first engagement device (1) can be reduced. Further, vibration caused by the operation of the second cam mechanism (42) is damped by the second elastic member (48) before reaching the second engagement device (2). As a result, the vibration transmitted from the second drive device (4) to the second engagement device (2) can be reduced.

There may be a case where the intermesh first engagement device (1) is not immediately engaged due to phase mismatch of intermesh portions depending on, for example, the traveling state of the vehicle. According to this configuration, even if the first engagement device (1) is not immediately engaged, it is possible to wait until the first engagement device (1) is engaged by a change in, for example, the traveling state of the vehicle while the driving force from the first cam mechanism (32) remains applied to the first engagement device (1) as the elastic force of the first elastic member (38). Thus, it is easy to appropriately engage the intermesh first engagement device (1).

It is preferable that the transmission (TM) further include an intermesh third engagement device (5), assuming that a direction along the linear motion of the first transmission mechanism (33) is a first direction (D1), the third engagement device (5) be disposed to adjoin the first engagement device (1) in the first direction (D1) and be driven by the first drive device (3), and the first shift speed be formed when the first engagement device (1) is engaged and both the second engagement device (2) and the third engagement device (5) are disengaged, and the second shift speed be formed when the first engagement device (1) is disengaged and at least one of the second engagement device (2) and the third engagement device (5) is engaged.

According to this configuration, the second engagement device (2) can be disengaged while maintaining the state in which the second shift speed is formed by engaging the third engagement device (5). As a result, when the frictional second engagement device (2) needs to keep applying the driving force to maintain the engaged state, the need for the driving force can be eliminated. Therefore, the energy efficiency of the vehicle drive transmission device (100) can be increased.

According to this configuration, the first engagement device (1) and the third engagement device (5) are disposed to adjoin each other in the first direction (D1) and are driven by the common first drive device (3). This facilitates partial sharing of the configuration between the first engagement device (1) and the third engagement device (5). Thus, the first engagement device (1) and the third engagement device (5) as a whole can easily be downsized as compared with a configuration in which the first engagement device (1) and the third engagement device (5) are provided independently.

In the configuration in which the transmission (TM) includes the third engagement device (5), it is preferable that the first cam mechanism (32) include a first cam path (34) that is provided along a rotation direction of the first shift drum (31) and changes in phase in response to rotation of the first shift drum (31), the second cam mechanism (42) include a second cam path (44) that is provided along a rotation direction of the second shift drum (41) and changes in phase in response to rotation of the second shift drum (41), the first transmission mechanism (33) be configured to drive the first engagement device (1) and the third engagement device (5) by performing linear motion depending on the phase of the first cam path (34), the second transmission mechanism (43) be configured to drive the second engagement device (2) by performing linear motion depending on the phase of the second cam path (44), the first cam path (34) include, in the following stated order along the rotation direction of the first shift drum (31), a first keeping portion (34a) that keeps a neutral phase (P0), a first transition portion (34b) that transitions from the neutral phase (P0) to a first phase (P1), a second keeping portion (34c) that keeps the first phase (P1), a second transition portion (34d) that transitions from the first phase (P1) to the neutral phase (P0), a third keeping portion (34e) that keeps the neutral phase (P0), a third transition portion (34f) that transitions from the neutral phase (P0) to a second phase (P2), a fourth keeping portion (34g) that keeps the second phase (P2), and a fourth transition portion (34h) that transitions from the second phase (P2) to the neutral phase (P0), in the neutral phase (P0), the first transmission mechanism (33) disengage both the first engagement device (1) and the third engagement device (5), in the first phase (P1), the first transmission mechanism (33) engage the first engagement device (1) and disengage the third engagement device (5), in the second phase (P2), the first transmission mechanism (33) disengage the first engagement device (1) and engage the third engagement device (5), the second cam path (44) include, in the following stated order along the rotation direction of the second shift drum (41), a fifth keeping portion (44a) that keeps a disengagement phase (Poff), a fifth transition portion (44b) that transitions from the disengagement phase (Poff) to an engagement phase (Pon), a sixth keeping portion (44c) that keeps the engagement phase (Pon), and a sixth transition portion (44d) that transitions from the engagement phase (Pon) to the disengagement phase (Poff), in the engagement phase (Pon), the second transmission mechanism (43) engage the second engagement device (2), in the disengagement phase (Poff), the second transmission mechanism (43) disengage the second engagement device (2), and the third keeping portion (34e) and the fifth transition portion (44b) be disposed to overlap each other and a portion corresponding to the entire third transition portion (34f) and a part including a starting point of the fourth keeping portion (34g) and the sixth keeping portion (44c) be disposed to overlap each other in a positional relationship between the first cam path (34) and the second cam path (44) in a case where an operating position of the first cam mechanism (32) in the rotation direction of the first shift drum (31) agrees with an operating position of the second cam mechanism (42) in the rotation direction of the second shift drum (41).

According to this configuration, the first cam path (34) includes the first keeping portion (34a), the first transition portion (34b), the second keeping portion (34c), the second transition portion (34d), the third keeping portion (34e), the third transition portion (34f), the fourth keeping portion (34g), and the fourth transition portion (34h) in the stated order along the rotation direction of the first shift drum (31). The second cam path (44) includes the fifth keeping portion (44a), the fifth transition portion (44b), the sixth keeping portion (44c), and the sixth transition portion (44d) in the stated order along the rotation direction of the second shift drum (41). As a result, the shift speed of the transmission (TM) can appropriately be switched between the first shift speed and the second shift speed by simply rotating the drive shaft (40a) in one direction.

When the intermesh first engagement device (1) is transmitting the traveling driving force between the input member (I) and the output member (O), the first drive device (3) attempting to disengage the first engagement device (1) may fail to disengage the first engagement device (1) because the first engagement device (1) cannot be unmeshed. According to this configuration, the third keeping portion (34e) of the first cam path (34) and the fifth transition portion (44b) of the second cam path (44) are disposed to overlap each other in the positional relationship between the first cam path (34) and the second cam path (44) in the case where the operating position of the first cam mechanism (32) in the rotation direction of the first shift drum (31) agrees with the operating position of the second cam mechanism (42) in the rotation direction of the second shift drum (41). Therefore, the first cam mechanism (32) waits while applying the driving force in the direction in which the first engagement device (1) is disengaged, and the engagement force of the frictional second engagement device (2) is gradually increased. Thus, the transmission path of the traveling driving force between the input member (I) and the output member (O) can gradually be shifted from the path via the first engagement device (1) to the path via the second engagement device (2). When the transmission ratio of the traveling driving force from the second engagement device (2) is equal to or larger than a predetermined level and the traveling driving force transmitted via the first engagement device (1) decreases, the first engagement device (1) is disengaged automatically. As a result, it is possible to smoothly shift from the first shift speed to the second shift speed while avoiding interruption of the power transmission between the input member (I) and the output member (O).

According to this configuration, the portion corresponding to the entire third transition portion (34*f*) and the part including the starting point of the fourth keeping portion (34*g*) in the first cam path (34) and the sixth keeping portion (44*c*) of the second cam path (44) are disposed to overlap each other in the positional relationship between the first cam path (34) and the second cam path (44) in the case where the operating position of the first cam mechanism (32) in the rotation direction of the first shift drum (31) agrees with the operating position of the second cam mechanism (42) in the rotation direction of the second shift drum (41). Therefore, even after the phase of the first cam path (34) changes to the second phase (P2) for engaging the third engagement device (5), the phase of the second cam path (44) remains, for a predetermined period, the engagement phase (Pon) for engaging the second engagement device (2). As a result, even if the intermesh third engagement device (5) is not immediately engaged due to phase mismatch of intermesh portions, the engagement state of the second engagement device (2) can be maintained. Thus, the interruption of the power transmission between the input member (I) and the output member (O) can be avoided. Further, determination can be made as to whether the third engagement device (5) is appropriately engaged during a period in which the phase of the second cam path (44) remains the engagement phase (Pon) after the phase of the first cam path (34) has changed to the second phase (P2).

It is preferable that the second engagement device (2) include a friction member (21) and a piston (22) configured to press the friction member (21), assuming that a direction along the linear motion of the second transmission mechanism (43) is a second direction (D2), the second transmission mechanism (43) include a piston drive member (47) configured to drive the piston (22), and a bearing (50) disposed between the piston (22) and the piston drive member (47) in the second direction (D2), and when the second engagement device (2) is engaged, the bearing (50) relatively support the piston (22) and the piston drive member (47) in the second direction (D2) so that the piston (22) and the piston drive member (47) rotate relative to each other.

According to this configuration, the piston (22) can be driven by the piston drive member (47) while the piston (22) and the piston drive member (47) are rotatable relative to each other. Thus, the engagement state of the second engagement device (2) can appropriately be changed with a simple configuration.

INDUSTRIAL APPLICABILITY

The technology according to the present disclosure is applicable to a vehicle drive transmission device including an input member drivingly connected to a driving force source for wheels, an output member drivingly connected to the wheels, and a transmission that changes the speed of rotation transmitted from the input member side and transmits the rotation to the output member side.

DESCRIPTION OF THE REFERENCE NUMERALS

100: vehicle drive transmission device, 1: first engagement device, 2: second engagement device, 3: first drive device, 31: first shift drum, 32: first cam mechanism, 33: first transmission mechanism, 4: second drive device, 41: second shift drum, 42: second cam mechanism, 43: second transmission mechanism, 40: drum drive source, 40*a*: drive shaft, I: input member, O: output member, TM: transmission, MG: rotary electric machine (driving force source)

The invention claimed is:

1. A vehicle drive transmission device comprising:
an input member drivingly connected to a driving force source for a wheel;
an output member drivingly connected to the wheel; and
a transmission configured to form a plurality of shift speeds including a first shift speed and a second shift speed having a smaller speed ratio than the first shift speed, and to change a speed of rotation transmitted from a side of the input member at a speed ratio corresponding to a formed shift speed among the plurality of shift speeds and transmit the rotation to a side of the output member, wherein
the transmission includes an intermesh first engagement device, a frictional second engagement device, a first drive device configured to drive the first engagement device, and a second drive device configured to drive the second engagement device,
the first shift speed is formed when the first engagement device is engaged and the second engagement device is disengaged, and the second shift speed is formed when the first engagement device is disengaged and the second engagement device is engaged,
the first drive device includes a rotatably supported first shift drum, a first cam mechanism configured to convert rotational motion of the first shift drum into linear motion, and a first transmission mechanism configured to perform linear motion by the first cam mechanism,
the second drive device includes a rotatably supported second shift drum, a second cam mechanism configured to convert rotational motion of the second shift drum into linear motion, and a second transmission mechanism configured to perform linear motion by the second cam mechanism,
the first shift drum and the second shift drum are connected so as to rotate integrally with each other via a drive shaft, and
a drum drive source is provided to drive the drive shaft to rotate the first shift drum and the second shift drum.

2. A vehicle drive transmission device comprising:
an input member drivingly connected to a driving force source for a wheel;
an output member drivingly connected to the wheel; and
a transmission configured to form a plurality of shift speeds including a first shift speed and a second shift speed having a smaller speed ratio than the first shift speed, and to change a speed of rotation transmitted from a side of the input member at a speed ratio corresponding to a formed shift speed among the plurality of shift speeds and transmit the rotation to a side of the output member, wherein the transmission includes an intermesh first engagement device, a frictional second engagement device, an intermesh third engagement device, a first drive device configured to drive the first engagement device, and a second drive device configured to drive the second engagement device, the first shift speed is formed when the first engagement device is engaged and both the second engagement device and the third engagement device are disengaged, and the second shift speed is formed when the first engagement device is disengaged and at least one of the second engagement device and the third engagement device is engaged, the first drive device includes a rotatably supported first shift drum, a first cam mechanism configured to convert rotational motion of the first shift drum into linear motion, and a first transmission mechanism configured to perform linear motion by the first cam mechanism, the second drive device includes a rotatably supported second shift drum, a second cam mechanism configured to convert rotational motion of the second shift drum into linear motion, and a second transmission mechanism configured to perform linear motion by the second cam mechanism, the first shift drum and the second shift drum are connected so as to rotate integrally with each other via a drive shaft, and a drum drive source is provided to drive the drive shaft to rotate the first shift drum and the second shift drum.

3. The vehicle drive transmission device according to claim 1, wherein the first transmission mechanism includes a first elastic member having elasticity in a direction of the linear motion of the first transmission mechanism, and is configured to transmit a driving force from the first cam mechanism to the first engagement device via the first elastic member, and the second transmission mechanism includes a second elastic member having elasticity in a direction of the linear motion of the second transmission mechanism, and is configured to transmit a driving force from the second cam mechanism to the second engagement device via the second elastic member.

4. The vehicle drive transmission device according to claim 1, wherein the transmission further includes an intermesh third engagement device, assuming that a direction along the linear motion of the first transmission mechanism is a first direction, the third engagement device is disposed to adjoin the first engagement device in the first direction and is driven by the first drive device, and the first shift speed is formed when the first engagement device is engaged and both the second engagement device and the third engagement device are disengaged, and the second shift speed is formed when the first engagement device is disengaged and at least one of the second engagement device and the third engagement device is engaged.

5. The vehicle drive transmission device according to claim 4, wherein the first cam mechanism includes a first cam path that is provided along a rotation direction of the first shift drum and changes in phase in response to rotation of the first shift drum, the second cam mechanism includes a second cam path that is provided along a rotation direction of the second shift drum and changes in phase in response to rotation of the second shift drum, the first transmission mechanism is configured to drive the first engagement device and the third engagement device by performing linear motion depending on the phase of the first cam path, the second transmission mechanism is configured to drive the second engagement device by performing linear motion depending on the phase of the second cam path, the first cam path includes, in the following stated order along the rotation direction of the first shift drum, a first keeping portion that keeps a neutral phase, a first transition portion that transitions from the neutral phase to a first phase, a second keeping portion that keeps the first phase, a second transition portion that transitions from the first phase to the neutral phase, a third keeping portion that keeps the neutral phase, a third transition portion that transitions from the neutral phase to a second phase, a fourth keeping portion that keeps the second phase, and a fourth transition portion that transitions from the second phase to the neutral phase, in the neutral phase, the first transmission mechanism disengages both the first engagement device and the third engagement device, in the first phase, the first transmission mechanism engages the first engagement device and disengages the third engagement device, in the second phase, the first transmission mechanism disengages the first engagement device and engages the third engagement device, the second cam path includes, in the following stated order along the rotation direction of the second shift drum, a fifth keeping portion that keeps a disengagement phase, a fifth transition portion that transitions from the disengagement phase to an engagement phase, a sixth keeping portion that keeps the engagement phase, and a sixth transition portion that transitions from the engagement phase to the disengagement phase, in the engagement phase, the second transmission mechanism engages the second engagement device, in the disengagement phase, the second transmission mechanism disengages the second engagement device, and the third keeping portion and the fifth transition portion are disposed to overlap each other and a portion corresponding to the entire third transition portion and a part including a starting point of the fourth keeping portion and the sixth keeping portion are disposed to overlap each other in a positional relationship between the first cam path and the second cam path in a case where an operating position of the first cam mechanism in the rotation direction of the first shift drum agrees with an operating position of the second cam mechanism in the rotation direction of the second shift drum.

6. The vehicle drive transmission device according to claim 1, wherein the second engagement device includes a friction member and a piston configured to press the friction member, assuming that a direction along the linear motion of the second transmission mechanism is a second direction, the second transmission mechanism includes a piston drive member configured to drive the piston, and a bearing disposed between the piston and the piston drive member in the second direction, and when the second engagement device is engaged, the bearing relatively supports the piston and the piston drive member in the second direction so that the piston and the piston drive member rotate relative to each other.

* * * * *